US008122682B2

(12) United States Patent
Mischo

(10) Patent No.: US 8,122,682 B2
(45) Date of Patent: Feb. 28, 2012

(54) MODULAR BALLAST SYSTEM FOR MEMBRANE ROOFS

(75) Inventor: Donald J. Mischo, Janesville, WI (US)

(73) Assignee: American Builders & Contractors Supply Company, Inc., Beloit, WI (US)

(*) Notice: Subject to any disclaimer, the term of this patent is extended or adjusted under 35 U.S.C. 154(b) by 1123 days.

(21) Appl. No.: 10/652,836

(22) Filed: Aug. 29, 2003

(65) Prior Publication Data

US 2010/0325975 A1 Dec. 30, 2010

Related U.S. Application Data

(60) Provisional application No. 60/406,746, filed on Aug. 29, 2002, provisional application No. 60/426,079, filed on Nov. 12, 2002.

(51) Int. Cl.
*E04D 13/18* (2006.01)

(52) U.S. Cl. ......... 52/747.1; 47/66.1; 47/66.6; 52/173.3

(58) Field of Classification Search ............... 47/18, 46, 47/65.9, 66.5, 79, 29.7, 65.5, 65.6, 65.7, 47/66.1, 66.3, 66.6; 52/95, 410, 783.11, 52/173.3

See application file for complete search history.

(56) References Cited

U.S. PATENT DOCUMENTS

| | | | | |
|---|---|---|---|---|
| 986,395 A | * | 3/1911 | King | 47/33 |
| 1,996,898 A | * | 4/1935 | Brandell | 47/65.6 |
| 3,539,071 A | * | 11/1970 | Ludder | 220/23.4 |
| 3,683,549 A | * | 8/1972 | Simmon | 47/86 |
| 4,091,799 A | * | 5/1978 | Steiner | 126/581 |
| 4,118,892 A | * | 10/1978 | Nakamura et al. | 47/65.9 |
| 4,120,119 A | * | 10/1978 | Engel | 47/66.1 |
| 4,369,598 A | * | 1/1983 | Beckwith | 47/61 |
| 4,371,139 A | * | 2/1983 | Clark | 248/237 |
| 4,800,675 A | * | 1/1989 | Feil et al. | 47/33 |
| 4,926,586 A | * | 5/1990 | Nagamatsu | 47/65.9 |
| 4,943,185 A | * | 7/1990 | McGuckin et al. | 405/45 |
| 4,999,946 A | * | 3/1991 | DeGiglio et al. | 47/73 |
| 5,022,183 A | * | 6/1991 | Bohlmann | 47/86 |
| 5,125,608 A | * | 6/1992 | McMaster et al. | 248/163.1 |
| 5,181,297 A | * | 1/1993 | Andrews et al. | 24/336 |
| 5,187,894 A | * | 2/1993 | Ripley et al. | 47/86 |
| 5,228,924 A | * | 7/1993 | Barker et al. | 136/246 |
| 5,373,661 A | * | 12/1994 | Furukawa | 47/65.9 |
| 5,410,840 A | * | 5/1995 | Loesken | 47/58.1 R |
| RE35,006 E | * | 8/1995 | Ripley et al. | 47/65.9 |
| 5,467,555 A | * | 11/1995 | Ripley et al. | 47/65.9 |
| 5,595,021 A | * | 1/1997 | Ripley et al. | 47/66.5 |
| 5,673,513 A | * | 10/1997 | Casimaty | 47/65.9 |
| 5,927,009 A | * | 7/1999 | Vanwingerden | 47/73 |
| 6,046,399 A | * | 4/2000 | Kapner | 136/244 |
| 6,105,316 A | * | 8/2000 | Bottger et al. | 52/173.3 |
| 6,134,834 A | * | 10/2000 | Ripley et al. | 47/86 |

(Continued)

FOREIGN PATENT DOCUMENTS

DE EP0971576 A2 * 1/2000

(Continued)

*Primary Examiner* — William Gilbert
*Assistant Examiner* — James Ference
(74) *Attorney, Agent, or Firm* — Charles S. Sara, Esq.; DeWitt Ross & Stevens, S.C.

(57) ABSTRACT

A ballast system for roof membranes includes connected modules filled with loose-fill ballast and adapted to hold a predetermined volume of water for at least a predetermined period of time on the roof to control runoff.

37 Claims, 11 Drawing Sheets

U.S. PATENT DOCUMENTS

| | | | |
|---|---|---|---|
| 6,178,690 B1 * | 1/2001 | Yoshida et al. | 47/65.9 |
| 6,237,285 B1 * | 5/2001 | Yoshida et al. | 47/65.9 |
| 6,263,616 B1 * | 7/2001 | Hummer | 47/65.9 |
| 6,357,179 B1 * | 3/2002 | Buss | 47/65.5 |
| 6,606,823 B1 * | 8/2003 | McDonough et al. | 47/65.9 |
| 6,711,851 B2 * | 3/2004 | Mischo | 47/65.9 |
| 6,862,842 B2 * | 3/2005 | Mischo | 47/65.9 |
| 7,900,397 B2 * | 3/2011 | Mischo | 47/65.9 |
| 2002/0007591 A1 * | 1/2002 | Mischo | 47/65.9 |
| 2002/0007592 A1 * | 1/2002 | Mischo | 47/65.9 |
| 2002/0007593 A1 * | 1/2002 | Mischo | 47/86 |

FOREIGN PATENT DOCUMENTS

FR     2703213 A1 * 10/1994

* cited by examiner

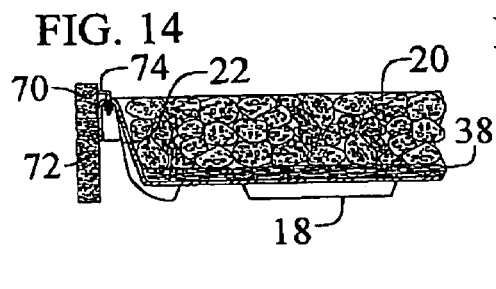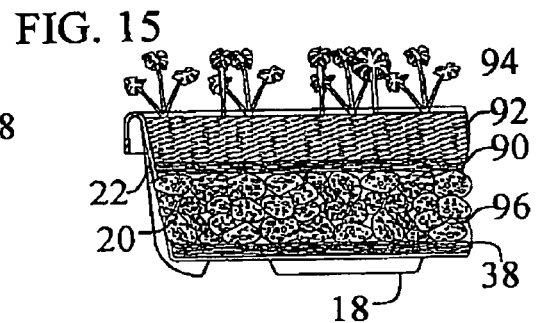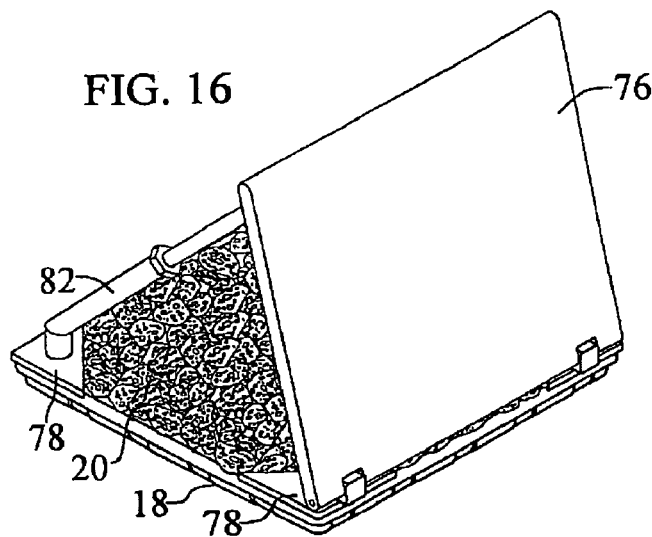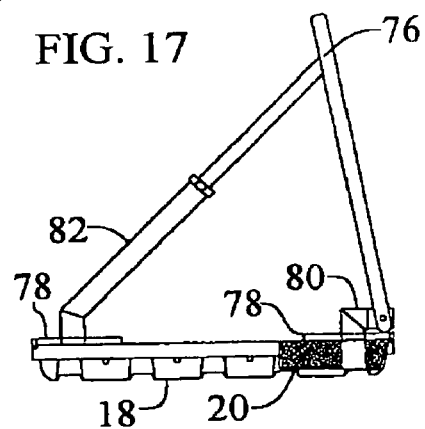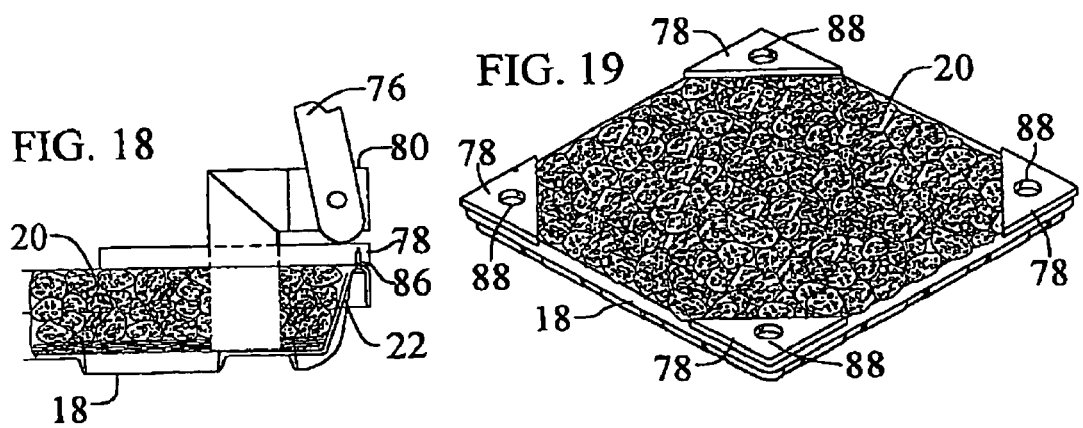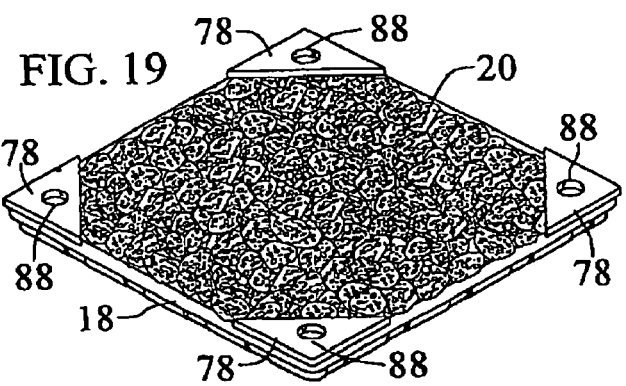

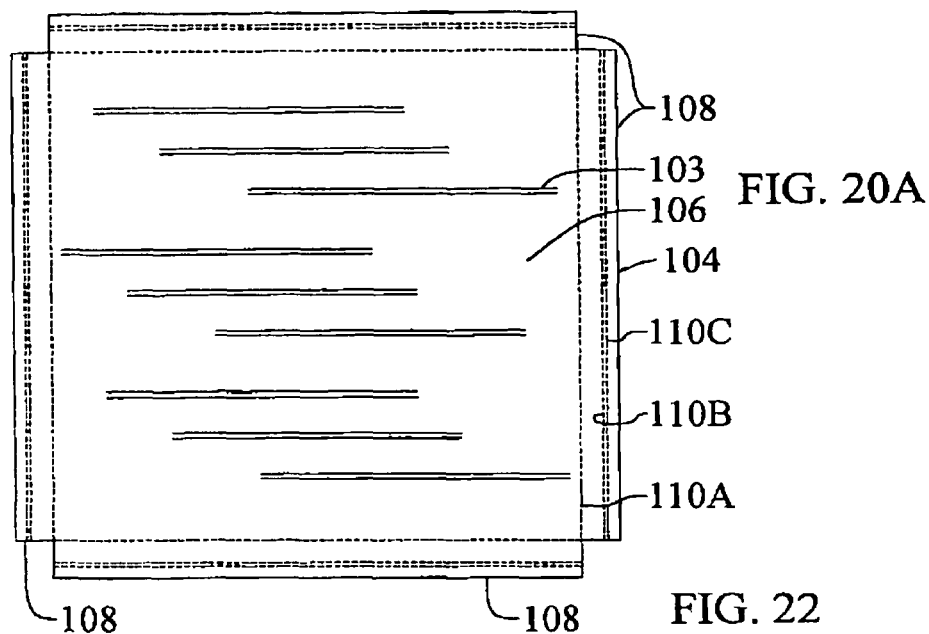
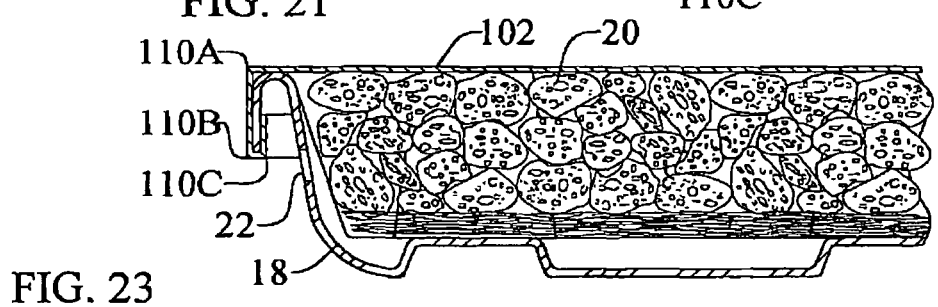
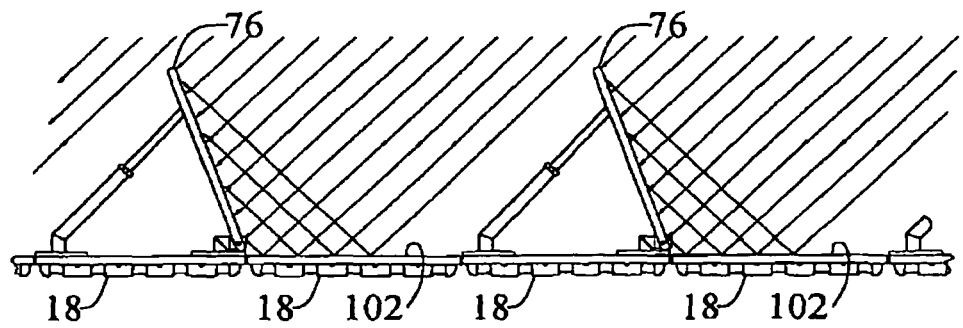

MODULAR BALLAST SYSTEM FOR MEMBRANE ROOFS

CROSS-REFERENCES TO RELATED APPLICATIONS

This application claims priority to U.S. Provisional Patent Application Ser. No. 60/406,746, filed Aug. 29, 2002, and U.S. Provisional Patent Application Ser. No. 60/426,079, filed Nov. 12, 2002.

REFERENCE TO SEQUENCE LISTING, TABLE, OR COMPUTER PROGRAM LISTING APPENDIX SUBMITTED ON A COMPACT DISC

N/A.

STATEMENT REGARDING FEDERALLY SPONSORED RESEARCH OR DEVELOPMENT

N/A.

BACKGROUND OF THE INVENTION

1. Field of Invention

The present invention relates to a modular system adapted to provide ballast to hold a roofing membrane in position, and to retain a relatively large volume of water on the roof to assist in control of water runoff from the building.

2. Description of Prior Art

Roof membranes of the type commonly specified on commercial or industrial buildings are held in place with weight resting on the membrane. The membrane is held in place with ballast materials such as round river rocks or weighted pavers made from concrete or other dense materials. Minimum ballast is commonly designated at approximately 11 lbs/sq-ft to hold the membrane in place. Additional ballast is specified as required such as to meet wind uplift resistance requirements.

It is often desirable and advantageous to retain water on the roof of such industrial and commercial buildings during rainfall. Retaining water on the roof reduces peak load in storm sewers, and smoothes out the peak sewer drainage load over a period of time. In certain locations such as densely developed cities controlling water runoff from a building may affect the footprint size of the building which may be built on a particular lot. Retaining water on the roof of a building also permits the retained water to evaporate from the roof over a long period of time, contributing to cooling of the roof surface and the air above roof. This cooling reduces the urban heat-island problem that is often associated with large buildings in densely developed areas.

Prior roof membrane ballast arrangements suffer from several drawbacks and disadvantages. Disadvantage of round river rocks is that they are relatively expensive, and it is difficult to maintain and repair the roof membrane because removal of the loose ballast material is a labor intensive, difficult and expensive process. It is also difficult to safely walk on a roof that is covered with loose round river rocks due to movement of rocks. And neither pavers nor round river rocks have any significant water retention capability.

Another type of system that is capable of providing ballast for a roof membrane is a green roof. Green roofs are provided as either modular or non-modular systems. The modular green roofs include modules that are positioned across the membrane in side-by-side relation and filled with growing medium and vegetation. Non-modular green roofs are established with fibrous mats laid over the membrane, such as with a base support mat and a top mat in which the vegetation grows.

One advantage of green roof systems is their ability to retain water during rainfall. However, green roofs are relative expensive, and they do not provide easily predictable rainfall retention characteristics. Variations in growing medium, plant type, root structure, and other covering result in variation of water retention capability. Thus, the water retention capability of a green roof can not be predetermined with repeatable specificity. And to prevent root rot, green roofs are intentionally designed to retain only limited volumes of water for any extended period of time. In modular systems, this is accomplished with drainage holes near the base of the modules below the growing medium, and in non-modular systems, this is accomplished through designation of the fiber structure and material of the base and top mats.

Consequently, there is a need for an improved ballast system for roofing membranes that addresses the above-identified drawbacks and disadvantages of prior ballast systems. In addition, there is a need for a ballast system that is adapted to retain predictable volumes of water on a roof during and after a rainfall.

SUMMARY OF THE INVENTION

The general aim of the present invention is to provide a new and improved ballast system that addresses the above-identified drawbacks and disadvantages of prior ballast systems, and simultaneously retains predictable, relatively large volumes of water on a roof during and after a rainfall for slow evaporation of the water.

A detailed objective is to achieve the foregoing by providing a ballast system that is cost effective in implementation, and that is further adapted for ease of maintenance and repair of the underlying roofing membrane.

Another detailed objective of the invention is to provide a ballast system adapted for additional choices in the selection of ballast materials, for both aesthetic and economic purposes, as compared with prior roofing ballast systems.

Yet another objective is to provide a ballast system that is adapted for use as a mounting platform for alternate energy generating apparatus to promote efficient use of the roof.

These and other objectives and advantages of the invention will become more apparent from the following detailed description when taken in conjunction with the accompanying drawings.

Briefly, a preferred ballast system of the present invention includes providing a plurality of modules that are capable of receiving and holding both a predetermined volume of water and a predetermined weight of loose ballast-fill material, filling the modules with the ballast material, and installing the modules in side-by-side relation on the roof membrane. The volume of water retained in the modules is established by the space-density of the ballast-fill material and the height of over-flow holes formed in the sides of the modules. Adjusting either the ballast-fill material or the height of the over-flow holes adjusts the water retention capability of the modules. The invention also provides for, among other things, connecting the modules together for enhanced resistance to wind uplift, including tying the modules over the entire roof or large sections together with wire cable, additional water retention capabilities in the modules, an edge finishing system, methods for pre-designating and predetermining ballast limits and water retention capabilities, and establishing a combined power generating ballast system for the roof.

In certain preferred alternate embodiments, a ballast system in provided with modules to control the rate of water outflow therefrom according to a predetermined schedule, both during and after a rainfall, the schedule being established to control and achieve desired water retention characteristics during a heavy rainfall, and a desired rate of water runoff from a roof thereafter, and associated methods associate therewith.

BRIEF DESCRIPTION OF THE DRAWINGS

FIG. 14 is a fragmentary cross-sectional view showing fourth embodiment edge finishing member connected to the ballast module.

FIG. 15 is an enlarged fragmentary cross-sectional view showing a ballast module provided with green roof materials.

FIG. 16 is a perspective view of a ballast module equipped with a photo-voltaic panel.

FIG. 17 is a side view of the ballast module equipped with the photo-voltaic panel.

FIG. 18 is an enlarged fragmentary side view of the ballast module equipped and photo-voltaic panel.

FIG. 19 is a perspective view of the ballast module adapted to support the photo-voltaic panel.

FIG. 20A is a top plan view of a reflective sheet prior to forming into a cover onto a module.

FIG. 21 is an enlarged fragmentary side view showing the reflective cover as formed and installed onto a module.

FIG. 22 is an enlarged fragmentary view showing extensions of adjacent covers connected for use as a larger cover unit.

FIG. 23 is a fragmentary side view of an installed ballast module system provided with photo-voltaic panels.

Figure 1:
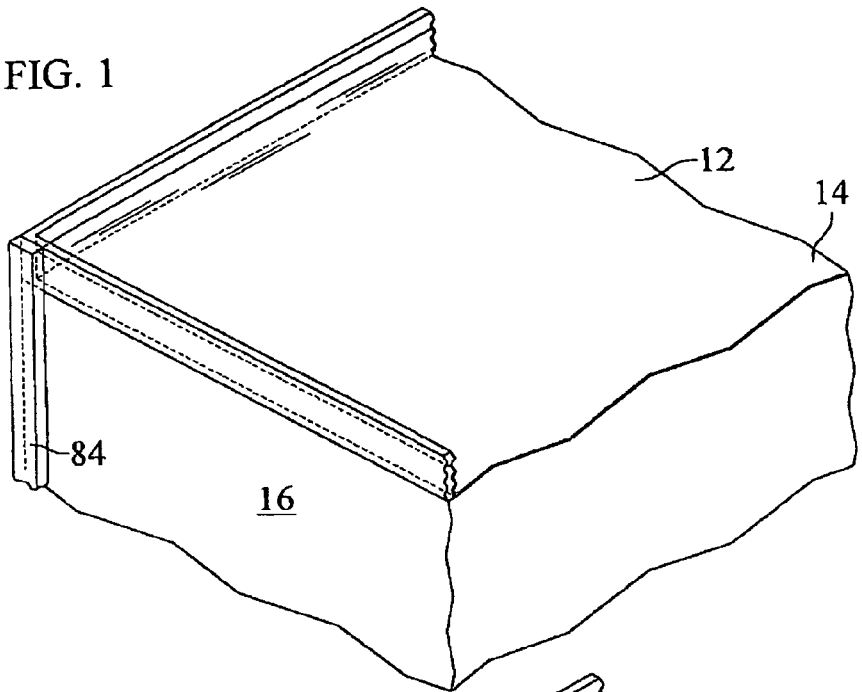
FIG. 1 is a fragmentary perspective view of a building and roof provided with a roofing membrane.

Reference numerals in the drawings correspond to the following items discussed in the detailed description below:
10—system
12—roof membrane
14—roof
16—building
18—module
20—ballast materials
22—over-flow holes
24—sidewalls
26—floor
28—feet
30—flange
32—connector holes/slots in flange
34—flange top
36—flange skirt
38—absorbent pad
40—bentonite clay
42—module connector
44—top bar of connector
46—legs of connector
48—barbs of connector
50—edge finishing system
52—hollow extruded finishing-member
54—clips
56—first alternate edge finishing member
58—elongated treated wood finishing-member
60—retainer clips 62—second alternate edge finishing member
64—extruded composite finishing-member
66—integrally extruded clip
68—integral support extrusion
70—third alternate edge finishing member
72—concrete edge finishing-member
74—masonry ties
76—photo-voltaic panel
78—corner gussets
80—front p-v panel supports
82—back p-v panel supports
84—building drain facility
86—fasteners
88—holes in corner gussets
90—inorganic root barrier
92—growing medium
94—plants
96—rocks
98—screen
98A—screen
100—screen clips
102—reflective cover
103—louvers
104—flat panel
105—perforations
106—center of reflective cover
108—extensions
110—score lines
112—first cut module-portion
114—second cut module portion
116—reduced-size module
118—cut line
120—absorbent wicking pad
122—wicking rope
124—seepage holes
130—connector
132—top connector member
132A—horizontal top portion
132B—downwardly extending legs
132C—clearance holes
134—bottom connector member
134A—horizontal bottom portion
134B—upwardly extending legs
134C—threaded holes
136—fasteners
136A—eyelets
138—wire cable
140—connector
142—top connector member
142A—horizontal leg
142B—vertical leg
142C—clearance holes
144—threaded fasteners
144B—clearance holes While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 2:
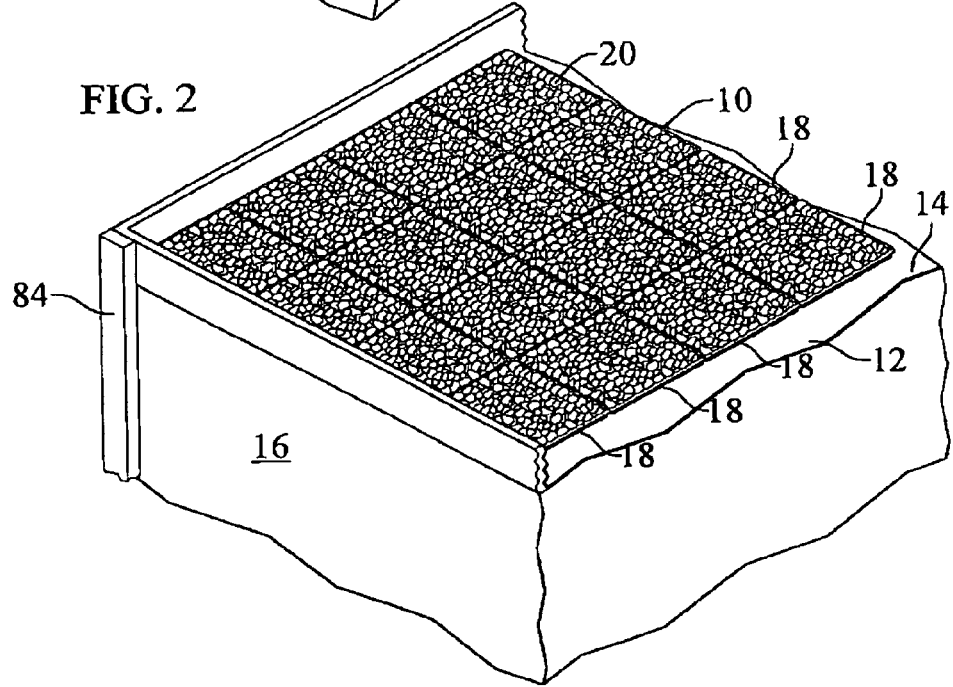
FIG. 2 is a view similar to FIG. 1, with the roof provided with a modular ballast system in accordance with the invention.
Figure 3:
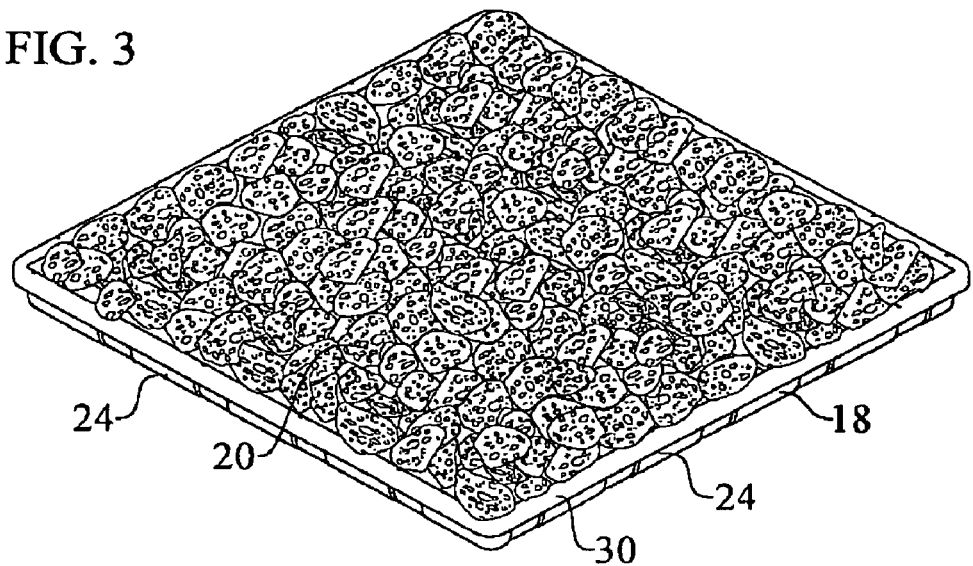
FIG. 3 is a perspective view of a module filled with ballast.
Figure 4:
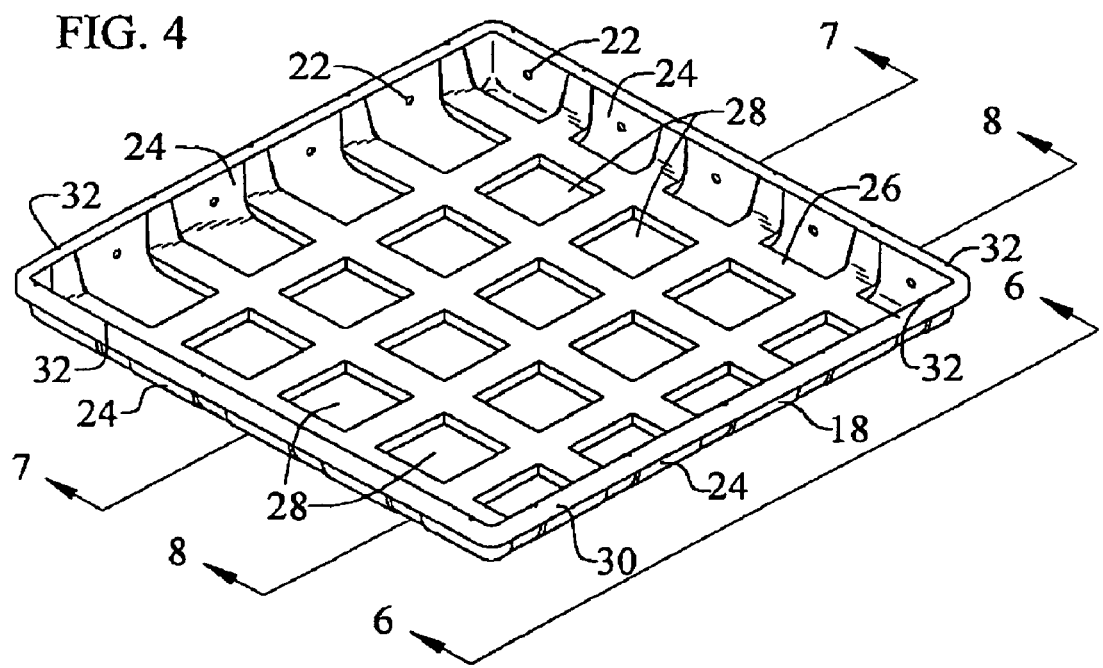
FIG. 4 is a top perspective view of an empty module.
Figure 5:
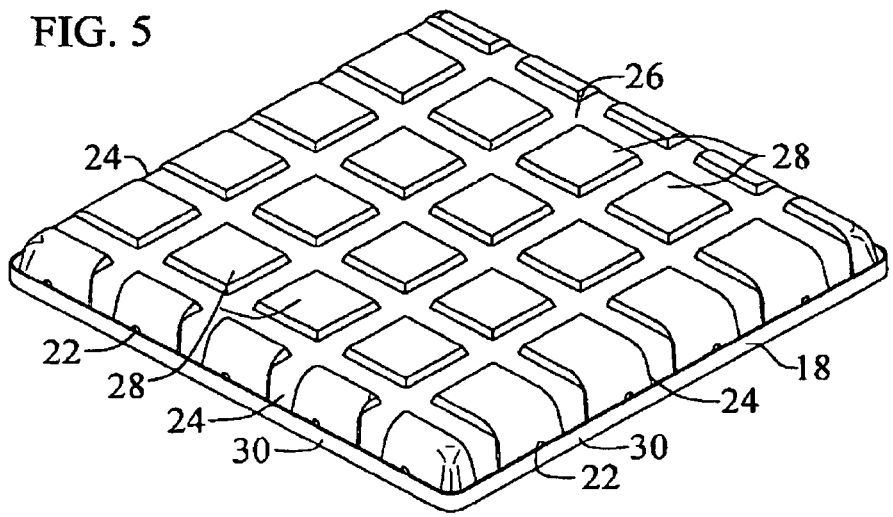
FIG. 5 is a bottom perspective view of the module.
Figure 6:
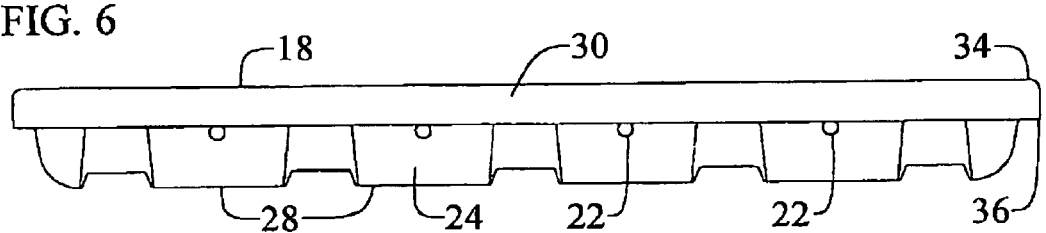
FIG. 6 is an enlarged side view of the module taken along the line 6-6 of FIG. 4.
Figure 7:
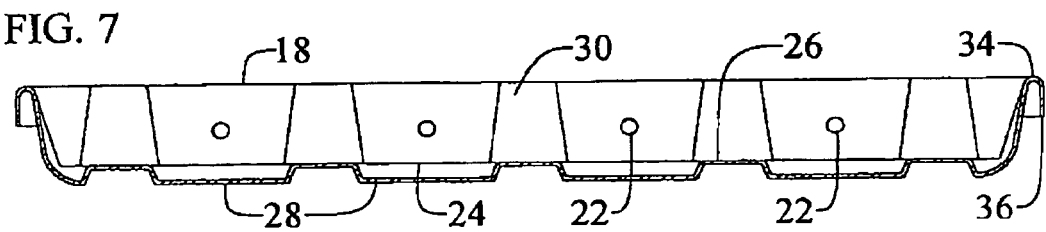
FIG. 7 is an enlarged cross-sectional view taken along the line 7-7 of FIG. 4.
Figure 8:
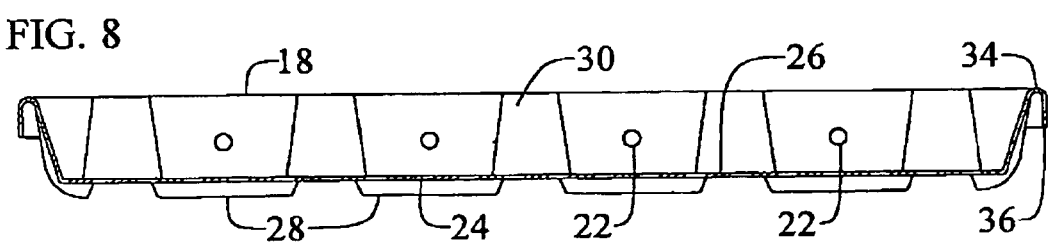
FIG. 8 is an enlarged cross-sectional view taken along the line 8-8 of FIG. 4.

For purposes of illustration, one embodiment of the present invention is shown as ballast system 10 (FIG. 2) adapted to (i) provide the ballast requirement for a roof membrane 12 (FIG. 1) on the roof 14 of a building 16, and (ii) simultaneously retain a relatively large, predetermined volume of water on the roof during and after a rainfall.

Briefly, these performance characteristics are accomplished by providing modules 18 that are capable of receiving and holding both a predetermined volume of rainfall and a predetermined weight of loose-fill ballast material 20, filling the modules with the ballast material, and installing the modules in side-by-side relation on the roof. The water retention capability of the modules is established by considering the volume of the ballast material in the modules and the overflow capacity of the modules. The volume of water actually retained in the modules is established with over-flow holes 22 in the sides 24 of the modules at a designated height, and the rate of runoff thereafter is established by the size and number of holes at the over-flow height and thereabove. The preferred ballast roofing system also includes module connectors and an edge finishing system as required for the particular roof installation.

Accordingly, the ballast module 18 (a) is suitable for both (i) holding required ballast material 20 and (ii) retaining a relatively large predetermined volume of water with the ballast, and (b) is intended for use on a roof that is capable of supporting the weight of both the ballast and the maximum retained water. Advantageously, the ballast module enables use of any suitable ballast material, including rocks or other decorative, preferably relatively dense, loose-fill materials.

In general, the ballast module 18 is a rectangular module, with an open top, a closed bottom, and surrounding sidewalls 24. One preferred module presents an approximately 2 ft.×2 ft. square footprint on the roof. This approximate size provides for ease of handling, particularly if the module is pre-filled with ballast 20 prior to installation onto the roof 14. A 2'×2' module pre-filled with ballast of approximately 11-12 lbs/sq ft. will weigh approximately 50 lbs, a weight that can be readily carried by installation workers. The sidewall structure of the modules provide lateral support for the ballast fill, to prevent shifting of the ballast in the modules, and thereby provide for ease of walking over the roof, on the loose ballast in the modules, as compared with walking on loose ballast laid directly on the roof membrane 12.

Each module 18 shown include a floor 26, a plurality of feet 28 that support the floor in a raised position above the roof membrane 12, the sidewalls 24 that surround the floor and taper outwardly upon progressing upwardly, and an edge terminating flange 30 that surrounds the upper portion of the sidewalls. The flange (i) extends outwardly from the sidewalls and then turns downwardly in spaced relation to the upper portion of the sidewalls to establish a surrounding skirt 36, and (ii) is provided with vertically extending apertures 32 spaced along the sides of the module. The apertures 32 are sized and shaped for receiving connectors inserted therein in a downwardly direction after two modules are positioned adjacent one another, the connectors being adapted to span across and connect adjacent installed modules together. As discussed further below, the flanges also enable connection of an edge finishing system between the skirt 36 and outer sidewalls 24 of outer modules of an installed ballast system. The feet are formed as downwardly opening voids from the floor, i.e., upwardly opening cups that extend downwardly from the floor, and are approximately uniformly spaced to establish a set of interconnected water pathways below the floor and between the feet in a criss-cross or waffle-type pattern to allow multi-directional water flow on the membrane below the floor. In this way, the modules permit normal water drainage on the roof membrane to the building drainage facility 84. The downwardly extending, granular-receiving cups of the waffle-pattern floor, as well as the ribs in the sidewall, further stabilize the granular ballast in the modules for enhanced ease of walking on the ballast and across the roof. The feet are further provided with relatively flat co-planar bottoms sized to permit sufficient water flow under the module, while simultaneously providing sufficient contact surface area on the roof membrane to support the ballast without damage to the membrane from the weight of the ballast. Outer feet spaced along the edges of the module provide stable edge support of the filled module. The floor and feet cooperate to define a closed bottom through which no water is allowed to flow, and thus to retain water in the modules.

The over-flow holes 22 are formed through the sidewalls 24 of the modules 18 at a predetermined position above the bottom of the feet to effect retention of a predetermined volume of rainfall in the modules. The position, size, and frequency of the over-flow holes establish the desired runoff control characteristics, and thus the characteristic of the smoothing of the peak load in the storm sewers. The vertical position of the over-flow holes provides the capability to retain a predetermined volume of water, up to the height of the holes. The volume of space available for water is equal to the volume of space in the module below the over-flow holes minus the volume of that space that is used by the ballast; and the volume of retained water is adjusted by adjusting either the volume of the ballast in the filled modules or the vertical position of the over-flow holes. The size and frequency of the over-flow holes, establishing the cumulative flow area of the holes, controls the rate of runoff from the modules after the water level reaches the height of the holes, up to the maximum capacity of the modules established at the top of the flanges.

For optional extended water retention in a module 18, and to further slow evaporation of water from the module, an inorganic fibrous mat or pad 38 of highly absorbent material is provided across the floor 26, the pad being adapted to hold moisture for a longer period of time due to enhanced resistance to evaporation as compared with standing water in the module. A semi-porous ballast such as lava-rock may also be used as ballast fill for enhanced moisture retention capability in the modules. And for yet additional extended water retention capability, a layer of absorbent bentonite clay 40 may be provided below the mat 38, the bentonite clay being adapted to resist evaporation and hold water for an even longer period of time. The bentonite clay may be contained in close-woven fabric to establish a pad or pillow of clay laid in the bottom of the modules.

One preferred module 18 is approximately 2½" deep. This preferred depth enables provision of sufficient ballast of at least 11 lbs/sq-ft to obtain the minimum required ballast for most roof membranes if the modules are filled with conventional rocks 96 of average density. Alternate depth modules will range from 2½ to 10 inches, with the deeper modules typically being used with less dense ballast and/or with additional green roof materials as discussed further below.

Figure 9A:
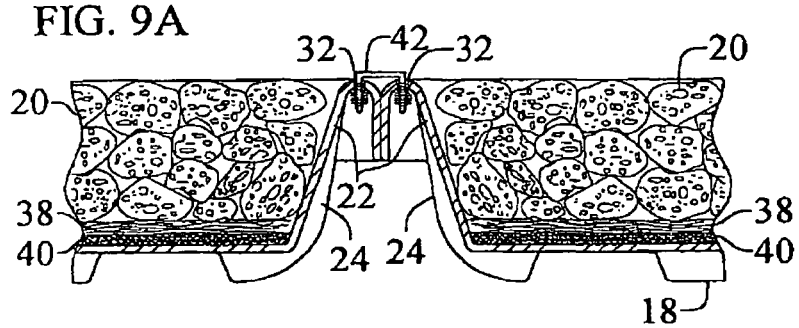
FIG. 9A is an enlarged fragmentary cross-sectional view showing two filled ballast modules connected together.
Figure 10:
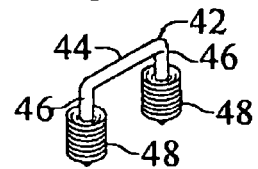
FIG. 10 is a perspective view of the connector shown in FIGS. 9A-B.

To provide enhanced resistance to wind uplift, the sides of adjacent modules are connected together. Connectors are provided in the form of a quick-connect fastener such as a clip-in or push-in type fastener adapted for locking, vertical insertion into aligned apertures 32 formed in the sides of adjacent modules 18 after the modules are positioned on the roof. One preferred connector 42 shown as installed in FIG. 9A and in detail in FIG. 10 is provided with a top bar 44 that spans the horizontal space between the aligned apertures 32 in the adjacent modules and a pair of spaced legs 46 to define a generally U-shaped connector. The legs 46 are sized to extend through the apertures 32 to below the bottom of the horizontal portion 34 of the flange 30, and are provided with free ends having longitudinally spaced radially extending barbs 48 that are resiliently compressible for ease of insertion into appropriately sized apertures 32, but are resistively expandable to resist removal therefrom via contact with the bottom of the horizontal portion 34 of the flange.

Figure 34:
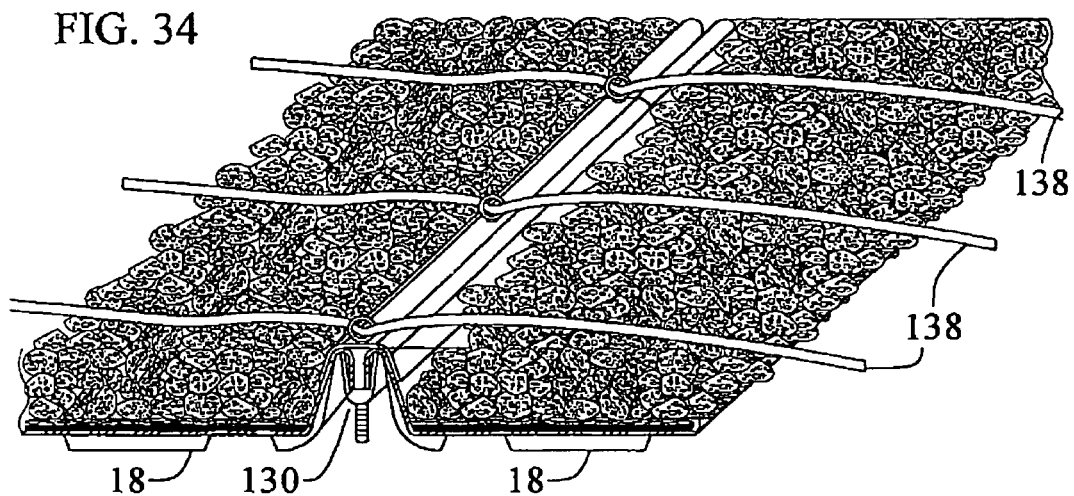
FIG. 34 is a fragmentary perspective view of an alternate connector, modules and a cable tie-down system.
Figure 35:
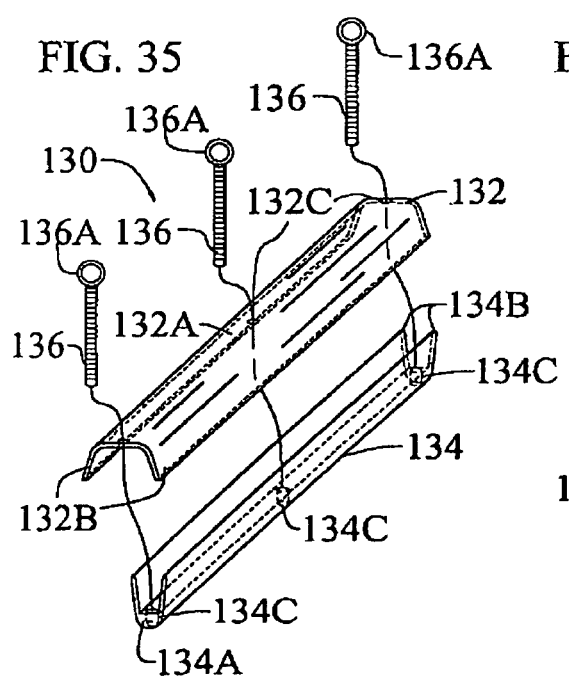
FIG. 35 is an exploded perspective view of the connector shown in FIG. 34.

An alternate module connector 130 is shown installed in FIG. 34 and in detail in FIG. 35. Connector 130 includes a top member 132, a bottom member 134 and a set of fasteners 136. The top and bottom members are thin wall aluminum extrusions, or thick wall molded plastic members of a convenient length to span across the sides of adjacent module 18, such as 3" to ¼ the length of the module side. The top member is formed with a horizontal top portion 132A that spans across the joint between the adjacent modules, and legs 132B that extend downwardly from the sides of the top portion, and when the legs extend continuously from one end to the other, to establish a downwardly facing channel configuration. The width of the top portion 132A and the angle of the legs 132B are sized to fit snugly over the top of the adjacent module sides, and downwardly along the inside walls of the adjacent module sides. The bottom member is formed with a horizontal bottom portion 134A that spans across the bottom joint between the adjacent modules, and legs 134B that extend upwardly from the sides of the bottom portion, and when the legs extend continuously from one end to the other, to establish an upwardly facing channel configuration. The width of the bottom portion 134A and the angle of the legs 134B are sized to fit snugly around the open, lower, free-end portions of the flanges of the adjacent modules, and upwardly along the inside of the flanges to capture the free ends of the flanges together. The top member 132 is formed with vertical clearance fastener holes 132C, and the bottom member is formed with aligned threaded holes 134C. To install the connector, the top and bottom members are threaded together with the fasteners, but with the bottom member towards the lower end of the fasteners. The connector is then inserted between the adjacent modules, with the top portion aligned over the top of the flanges and the bottom portion aligned around the bottom of the flanges. The fasteners are then tightened to draw the sides of the modules snugly together. When the connector 130 is installed, as shown in FIG. 34, the threaded fasteners draw the top and bottom members snugly in position over the top and bottom of the sides and flanges of the adjacent modules, and draw the flanges of the adjacent modules together in a manner that precludes separation of the flanges such as under high wind conditions. Generally, the sides of the modules will flex sufficiently for the threaded fasteners to extend therebetween, without undue separation at a distance away from the fastener. In the event the sides of the modules are relatively stiff, the clearance holes in the top member may be used as a drill guide, to pre-drill clearance holes through the sides of the adjacent module flanges prior to installation of the connector.

The fasteners 136 of the connector 130 shown are provided with an eyelet 136A at the upper free end. For further enhanced resistance to wind uplift, wire cables 138 are threaded between, and optionally wrapped around or otherwise connected to, the eyelets of connectors such as positioned between adjacent modules along rows or columns of modules on the roof. The cables may be anchored to the building structure such as to the roof deck or to anchors connected thereto.

Figure 36:
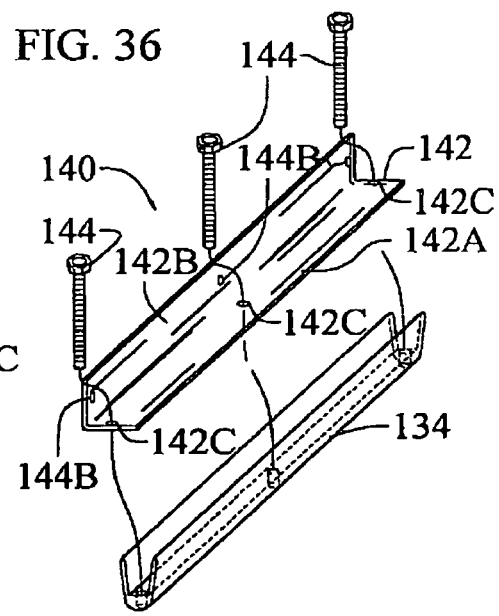
FIG. 36 is an exploded perspective view of another alternate connector.

A second alternate connector 140 is shown in FIG. 36. The connector 140 includes a top member 142, the bottom member 134 described above, and threaded fasteners 144. The threaded fasteners shown are provided with conventional heads, but may be alternately provided with eyelets to enable a cable tie-down. In this instance, the top member is configured with an angle section having a horizontal leg 142A provided with fastener clearance holes 142C, and a vertical leg 142B extending upwardly from one side of the horizontal leg. The vertical leg is provided with means for attaching other structure thereto, such as the clearance holes 144B shown. This connector enables securing of structure to and above the ballast system, such as the photo-voltaic panels shown in FIGS. 37-38 and discussed below. Those skilled in the art will readily devise alternate connectors adapted for spanning across the flanges of adjacent modules, and adapted to provide locking engagement between adjacent modules as the modules are installed onto a roof. Such connectors will include additional connectors configured for vertical locking insertion into connector openings in the flanges of adjacent modules, and locking installation both above and below the flanges of adjacent panels, to draw the flanges into firm locking engagement.

Figure 9B:
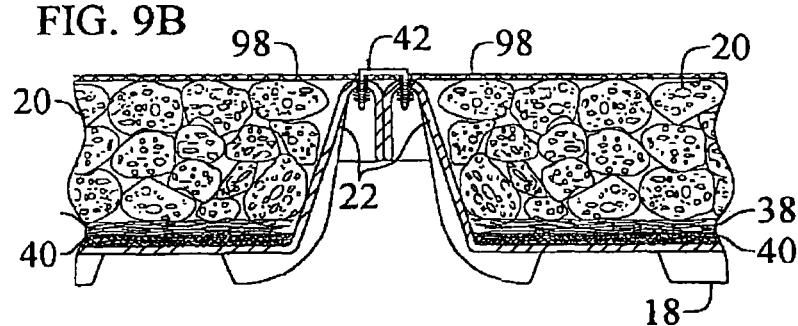
FIG. 9B is a view similar to FIG. 9A including a bug-screen covering the modules.
Figure 9C:
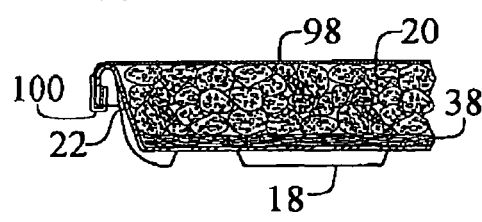
FIG. 9C is a fragmentary side view of a module and screen held in place with a skirt connector.
Figure 11:
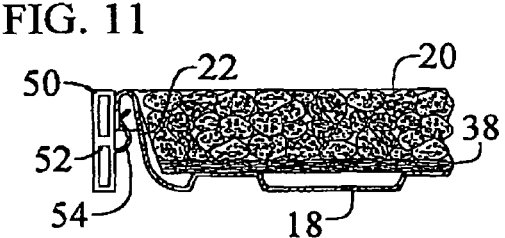
FIG. 11 is a fragmentary cross-sectional view showing one embodiment edge finishing member connected to the ballast module.
Figure 12:
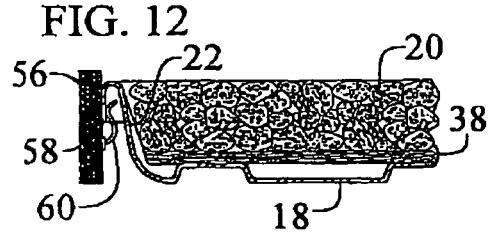
FIG. 12 is a fragmentary cross-sectional view showing a second embodiment edge finishing member connected to the ballast module.
Figure 13:
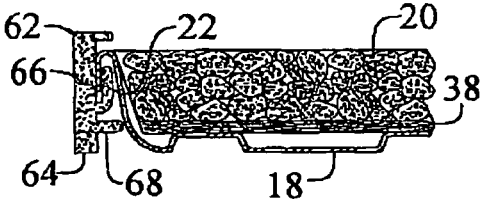
FIG. 13 is a fragmentary cross-sectional view showing a third embodiment edge finishing member connected to the ballast module.
Figure 39:
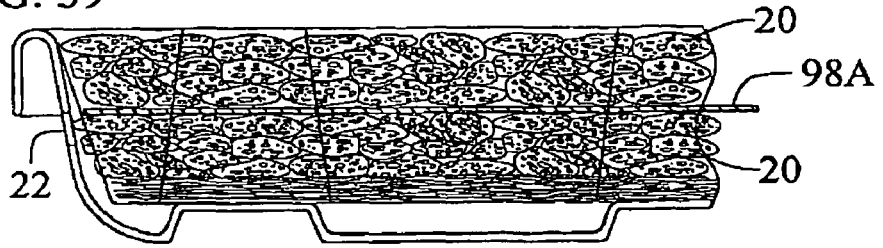
FIG. 39 is a fragmentary cross-section side view of an alternate arrangement to anchor a screen into a module.
Figure 29:
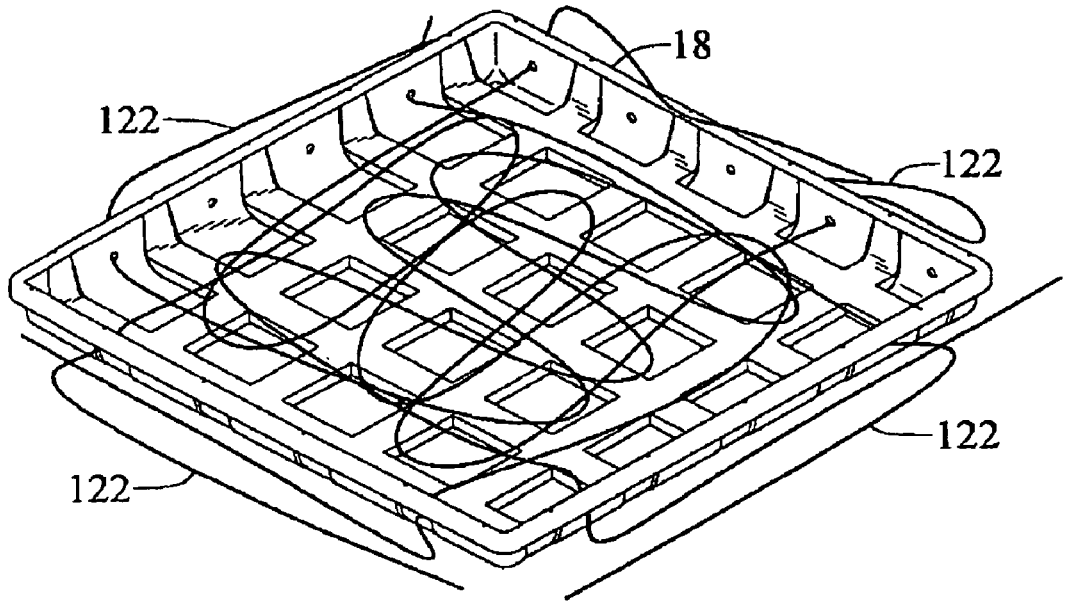
FIGS. 29 and 30 are perspective views of a ballast module provided with alternate wicking materials for controller outflow of water.

For use in geographic areas where standing water is of concern such as providing a breeding location for misquotes, the modules 18 are provided with a metal or fabric mesh screen 98 that covers the entire open top of the modules. The screens are secured in position with, for example, the connectors between adjacent modules (FIG. 9B), or with a lip extending down the skirt and/or folding around the bottom of the skirt for securing thereto, either by virtue of the self-retaining folded structure of metal screens or with clips 100 or elongated clip extrusions that slip snugly upwardly onto and secure the edges of the screens to the skirt (FIG. 9C). The screen may also be secured in position as sandwiched between two layers of ballast. As shown in FIG. 39, the screen 98A may be laid on top of ballast at a position above the vertical-position overflow holes 22 in the sidewalls, and then additional ballast laid on top of the screen. Positioning the screen above the overflow holed assures that the screen is positioned above the level of standing water, while the top layer of ballast secures the screen in position in the module without the need for bending the sides of the screen, or clips or provision of other mechanical fastening arrangement.

An edge finishing system includes decorative, elongated terminating strips adapted to clip into position along the exposed sides of the installed modular ballast system 10. The edge finishing system enhances resistance against wind uplift by establishing a wind break between the potentially windy environment on the roof and otherwise exposed sides of outer modules of the installed ballast system. The edge finishing system also provide a completed, aesthetically appealing ballast system, concealing the outer sides of modules in those instances where such sides would otherwise be exposed to view. The edge finishing system is characterized with elongated beams (i) sized to extend along the length of the exposed side of the ballast system, spanning across adjacent modules, and extending from the flanges downwardly to the roof membrane 12 to establish the wind barrier, and (ii) provided with a connector mechanism for connecting to the flanges 30 of the outer modules after the modules have been installed into position on the roof 14.

Four alternate edge finishing systems illustrating two installation techniques are shown in FIGS. 11-14. The edge finishing system 50 of FIG. 11 includes a hollow extruded finishing-member 52 provided with either an elongated retainer extrusion clip having the profile shown or a plurality of individual clips 54 that are spaced longitudinally along the length of the finishing-member. The finishing-member and clips are sized and configured for installation against the outer edges of the modules by (i) positioning the finishing-member proximate the outer module flanges at an angle from vertical, and (ii) pivoting the finishing-member, counter-clockwise in the view shown, to pivot the bottom of the finishing-member toward the floor of the modules while pivoting the clips upwardly from below the bottom of the skirt 36 and into position on the inside of and into resilient engagement with the inside surface of the skirt. The edge finishing system 56 of FIG. 12 includes an elongated treated wood finishing-member 58 provided with longitudinally spaced retainer clips 60 adapted for installation as described above. The edge finishing system 62 of FIG. 13 includes an extruded composite finishing-member 64 provided with (i) an integrally extruded clip 66 sized for insertion into the space between the skirt and the sidewalls of the module and (ii) an integral horizontal support extrusion 68 sized to proximately engage the sidewalls of the modules to prevent the finishing-member from being inadvertently rotated or kicked past vertical upon or after installation. The edge finishing system 70 of FIG. 14 includes a lightweight concrete edge finishing-member 72 provided with longitudinally spaced masonry ties 74 adapted to slip downwardly into position through the connector apertures 32 formed through the sides of the module. Other configured edge finishing systems with the above-disclosed characteristics will be devised by those skilled in the art in view of the disclosure hereof.

Prior to installation of the ballast system 10, the modules 18 and ballast-fill materials 20 are selected and pre-designated to meet system weight distribution and predictable water retention characteristics. This includes determination and designation of module sizes, height(s) of over-flow holes 22, height(s) of sidewalls 24, and ballast-fill characteristics, details of which are discussed further below.

During installation of the ballast system 10, the modules 18 are placed onto the roof membrane 12 in side-by-side, contiguous relation; they are provided with ballast material 20; and adjacent modules are connected together. The modules are either installed empty and then filled with the ballast material, or they are installed pre-filled with ballast material, either carried or dragged into position on the roof with the flange, in which case rounded outer feet assist in preventing damage to the membrane. An edge finishing system such as described above is then installed along the sides of any exposed modules.

As previously noted, the water retention capability of the ballast system 10 is established by considering the volume of the ballast material 20 and the over-flow capacity of the modules. This enables predetermination of a predictable, constant volume water retention for an installed ballast roofing system. As also noted, the water retention capability of an installed ballast system is equal to the volume of space in the modules below the over-flow holes 22 minus the volume of that space taken by the ballast-fill material 20.

Designation and determination of the water retention capability of a ballast system is accomplished with the following mathematical relationships:

$$V_{RW} = \Sigma V_{RWi} = \Sigma (V_{Mi} \times SD_i)$$

where:
subscript "i" designates individual modules 18;
$V_{RW}$=volume of water retained in the ballast system;
$V_{RWi}$=cumulative volume of water retained in the individual modules of the ballast system;

$V_{Mi}$=inside volume of the individual modules below the over-flow holes;

$SD_i$=space-density of the ballast-fill material in the individual modules; the space-density is a unitless characteristic of the volume of air in a pile of ballast-fill material, as when piled into a module, that is available for occupancy by water;

and $$V_{Mi}=H_{RWi} \times A_i \times CF_i^1$$

where:

$H_{RWi}$=height of retained water in the individual modules, as established by the height of the over-flow holes in the sidewalls of the modules;

$A_i$=the footprint area of the individual modules on the roof;

$CF_i^1$=a correction factor, of value less than one, for the individual modules, to account for the fact that the "cross-sectional" area of retained water in the individual modules below the over-flow holes is not constant and not equal to the footprint area of the module, because of the tapered sidewalls and the reservoir units in the cupped feet;

thus $$V_{RW}=\Sigma(H_{RWi} \times A_i \times CF_i^1 \times SD_i).$$

For modules having different ballast-fill materials, the same water retention volume is achieved with:

$$H_{RW1} \times A_1 \times CF_1^1 \times SD_1 = H_{RW2} \times A_2 \times CF_2^1 \times SD_2$$

where:

subscripts "1" and "2" designate first and second modules.

And for modules having the same height over-flow holes, and the same ballast-fill material, the volume of retained water in a ballast system is determined by:

$$V_{RW}=H_{RW} \times SA_R \times CF^2 \times SD$$

where:

$H_{RW}$=height of over-flow holes in modules;

$SA_R$=surface area of roof membrane 12 covered by the ballast system=$\Sigma A_i$;

$CF^2$=correction factor, of value less than one, to account for the cumulative, weighted average $CF_i^1$ in the ballast system (~$\Sigma CF_i^1/i$);

$SD$=space-density of the ballast-fill material in the ballast system.

Designation and determination of the weight of the retained water and the ballast-fill material is accomplished with the following relationships:

$$W_{RW}=\Sigma W_{RWi}=\Sigma(V_{RWi} \times \rho_w)=\Sigma(H_{RWi} \times A_i \times CF_i^1 \times SD_i \times \rho_w)$$

where:

$W_{RW}$=weight of water retained in ballast system;

$W_{RWi}$=cumulative weight of water retained in the individual modules of the ballast roofing system;

$\rho_w$=weight density of water (conventional definition, e.g., kg/m$^3$);

$$W_B=W_{BD} \times SA_R$$

where:

$W_B$=weight of ballast-fill material in ballast roofing system;

$W_{BD}$=weight distribution requirement of ballast on roof membrane (unit weight per unit surface area of roof membrane, e.g., 11 kg/ft$^2$);

$SA_R$=surface area of roof membrane covered by ballast system;

$$W_B=\Sigma W_{Bi}=\Sigma(V_{Bi} \times \rho_{Bi})=\Sigma(H_{Bi} \times A_i \times CF_i^3 \times FD_i \times \rho_{Bi})$$

where:

$W_{Bi}$=cumulative weight of ballast-fill material in the individual modules of the ballast roofing system;

$V_{Bi}$=volume of the ballast-fill material in the individual modules;

$\rho_{Bi}$=weight density of ballast-fill material in the individual modules (conventional definition, e.g., kg/m$^3$)

$H_{Bi}$=height of ballast-fill material in the individual modules $CF_i^3$=a correction factor, of value less than one, for the individual modules, to account for the fact that the "cross-sectional" area of the individual modules below the height of the top of the ballast-fill is not constant and not equal to the footprint area of the module, because of the tapered sidewalls and cupped feet $FD_i$=fill-density of ballast-fill material in the individual modules; the fill-density is a unitless characteristic of the cumulative volume of space that is occupied by individual pieces of ballast-fill material, as when piled into a module, per unit volume of the piled material; $FD_i$=sum of the volume of individual pieces in a pile of ballast-fill material/the overall volume of the pile of ballast-fill material; $FD_i=1-SD_i$.

And for a ballast system utilizing the same ballast-fill material at a constant weight distribution over the entire roof, the weight of the ballast is determined by:

$$W_B=H_B \times SA_R \times CF^4 \times FD \times \rho_B)$$

where:

$H_B$=height of ballast in modules;

$SA_R$=surface area of roof membrane covered by ballast system=$\Sigma A_i$;

$CF^4$=correction factor, of value less than one, to account for the cumulative, weighted average $CF_i^3$ in the ballast system (~$\Sigma CF_i^3/I$);

$FD$=fill-density of the ballast-fill material in the ballast system;

$\rho_{Bi}$=weight density of ballast-fill material in the ballast system.

Using conventional mathematical techniques, with the foregoing relationships, and additional relationships that result therefrom, the specific water retention capability of a ballast system 10 may be predictably pre-designated at a desired volume by providing modules 18 with over-flow holes 22 positioned to retain water to pre-determined desired height(s), or alternately, forming the over-flow holes in the modules at the height(s) required to obtain the desired water retention capability.

One suitable method for providing a pre-designated water retention capability in accordance herewith includes:

1) selecting the ballast-fill material(s),
2) determining the space-density of the ballast-fill material(s),
3) determining the module-specific correction factor(s) ($CF_i^1$ and/or $CF_i^2$) for the module type(s) and size(s) to be used, and the surface area of the roof to be covered,
4) determining the height(s) of water retention to obtain the desired water retention capability, and
5) providing modules with over-flow holes positioned to retain water to the pre-determined height(s), or alternately, forming the over-flow holes in the modules at the height(s) required to obtain the desired water retention capability.

The water retention capability of an installed ballast system may be predictably calculated by determining and multiplying:
1) the space-density of the ballast-fill material(s) in the ballast system,
2) the height(s) of the over-flow holes in the modules,
3) the footprint area of the modules, and
4) the associated module-specific correction factor(s).

The maximum water retention capability of a specific roof may be determined by subtracting the weight of the required (or designated) ballast from the weight-carrying capability of the roof.

The module height(s) required to obtain the desired ballast distribution on the roof is predetermined by:
1) selecting the ballast-fill material(s),
2) determining the fill-density of the ballast-fill material(s),
3) determining the module-specific correction factor(s) ($CF_i^3$ and/or $CF_i^4$) for the module type(s) and size(s) to be used, and the surface area of the roof to be covered,
4) determining the minimum height(s) of ballast-fill to obtain the desired ballast distribution on the roof, and
5) providing modules with sidewalls having height(s) sufficient to retain the pre-determined ballast height(s).

The ballast on an installed roof may be calculated with:
1) the fill-density of the ballast-fill material(s) in the ballast system,
2) the weight-density of the ballast-fill material(s) in the ballast system,
3) the height(s) of the ballast in the modules,
4) the footprint area of the modules, and
5) the associated module-specific correction factor(s).

The above-described techniques are intended as illustrative, but not exhaustive, of the techniques available for use in connection with predictably designating, determining, pre-determining and/or pre-designating ballast-distribution and water retention characteristics of a modular ballast system 10 in accordance with the invention. The particular order of executing the above-described steps may be altered to obtain desired ballast system characteristics, and will be, in certain instances, be an iterative process for the system designer. The above relationships may also be used in alternate forms, and with alternate techniques to obtain desired ballast system weight distribution and water retention characteristics.

As also previously noted, the flow area of the over-flow holes 22 establishes the rate at which water exits the modules 18 after the water reaches the height of these holes. With conventional mass-flow continuity relationships, the dynamic performance of the ballast system 10 may be predictably designated prior to installation to meet additional desired water run-off characteristics in the event that rainfall exceeds the steady state water retention capability of the ballast system. Accordingly, designation of the dynamic water run-off characteristics of the ballast roofing system is accomplished with the following mathematical relationships:

$$dM_{RF}/dt = dM_{WR}/dt + dM_{RW}/dt$$

where
$dM_{RF}/dt$=mass flow rate of rainfall into a module
$dM_{WR}/dt$=mass flow rate out of module
$dM_{RW}/dt$=rate of change in mass of water retained in module $$dV_{WR}/dt = f(A_F) \sim K \times A_F$$

where:
$dV_{WR}/dt$=volumetric flow rate of water runoff out of module, through over-flow holes
$A_F$=flow area of over-flow holes
$f(A_F)$=function including $A_F$
$K$=a proportionality constant In other words, the volumetric flow rate of water runoff through over-flow holes 22 is a function of the flow area of the over-flow holes, and in a linear model, the derivative is generally proportional to the flow area of the over-flow holes. Consequently, pre-designation or pre-determination of the dynamic over-flow characteristics of the ballast system 10 includes the additional step of calculating and/or pre-designating the cumulative over-flow hole area to meet the desired dynamic characteristics such as rate of runoff and maximum transient additional weight of retained water in modules. With the above and other characteristics of the ballast system, the skilled artisan will be able to further determine the smoothing of peak load of storm sewers during rainfall.

Figure 26:
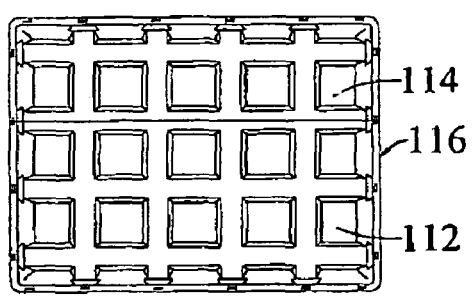
FIG. 26 is a top view of the cut module-portions, with the one module-portion in its final stacked position nested into the other module-portion to produce a reduced-size module.
Figure 28:
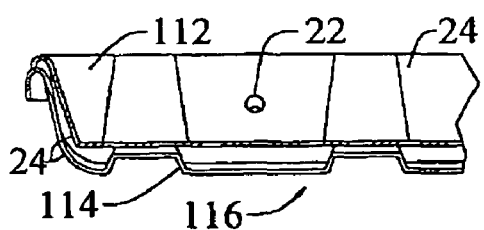
FIG. 28 is an enlarged fragmentary cross-sectional view showing two stacked module-portions with the flange cut away from one of the module-portions.
Figure 27:
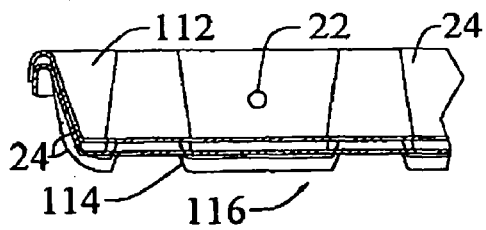
FIG. 27 is an enlarged fragmentary cross-sectional view showing two stacked module-portions with the flange of the upper module-portion expanded outwardly over the flange of the lower module-portion.

Reduced-size modules 116 (FIG. 26) may be produced during installation of a ballast roofing system by cutting a module 18 through the strip of the floor such as at 118 between adjacent rows of feet to obtain first and second module-portions 112 and 114, respectively, and positioning the open end of the first module-portion into the open end of the second module-portion to produce a smaller module with a reduced space surrounded by the uncut end walls and the nested sidewalls. The reduced-size module is then used as other modules, installed into the ballast roofing system, connected to adjacent modules, filled with ballast materials, and provided with an edge finishing system as desired. The weight of the ballast materials in the reduced-size module and connection to adjacent modules maintains the two cut module-portions together. In the production of reduced-size modules, the overlapping flanges of one of the cut module-portions may be optionally cut away such as shown in FIG. 27 and/or the flange of the upper module-portion may be expanded outwardly over the flange of the lower modular portion as shown in FIG. 28.

A ballast system in accordance with the invention is further uniquely adapted to serve as a roof-top mounting platform and anchoring system for a roof-top energy production system. In particular, the modular construction of the ballast system provides a mounting-adaptive structure, and the ballast provides anchoring of the structure and an energy production system connected thereto on the roof.

In the embodiment shown in FIGS. 16-23, ballast modules 18 are adapted for use with photo-voltaic panels 76 that are electrically connected to a power utilization device, a power conversion device, or a power storage device such as a battery to produce a combination ballast and electrical generating system on the roof of a building. The modules are provided with base support such as shown in the drawings as corner braces 78, a pair of front supports 80 carried in the front corner braces, and a pair of back supports 82, carried in the back corner braces. The front supports pivotally carry the base of the photo-voltaic panel, while the back supports engage and support the top of the photo-voltaic panel. The back supports are adjustable in length to support the panel at a desired angle, to achieve a desired exposure to the sun, during installation of the ballast system. The corner braces are connected to the flanges 30 of the module 18 such as with fasteners 86 (FIG. 18), and are provided with mounting structure such as holes 88 for receiving and supporting base posts of the front and back supports. These or alternate support brackets may be integrally adhered to or molded in the module, and the ballast modules may carry alternate energy production such as small windmills connected to electrical generating devices, or solar energy absorption panels connected to energy storage or conversion devices. Additional grid-structure support braces may also be located between the roof membrane and the underside of the flange to provide additional support to the flange and equipment mounted thereon.

The cost of photo-voltaic panels is relatively high. Therefore, in certain instances, it may be desirable that photo-voltaic panels are installed on less than all of the modules of the ballast system. In such installations, the remainder of the ballast modules are provided with light-colored reflective covers adapted to reflect sunlight impinging thereon onto a photo-voltaic panel proximate thereto (FIG. 23).

The reflective covers are generally planar, sheet metal covers that slip over the entire open tops of the modules, are louvered or perforated to reflect and redirect the sunlight as desired while enabling rain-fall to enter the modules and permitting evaporation therethrough. The covers are secured in position on the modules such as with connectors 42 connecting the adjacent modules, or with a clip adapted to slip smugly around the bottom of the skirt.

Figure 20B:
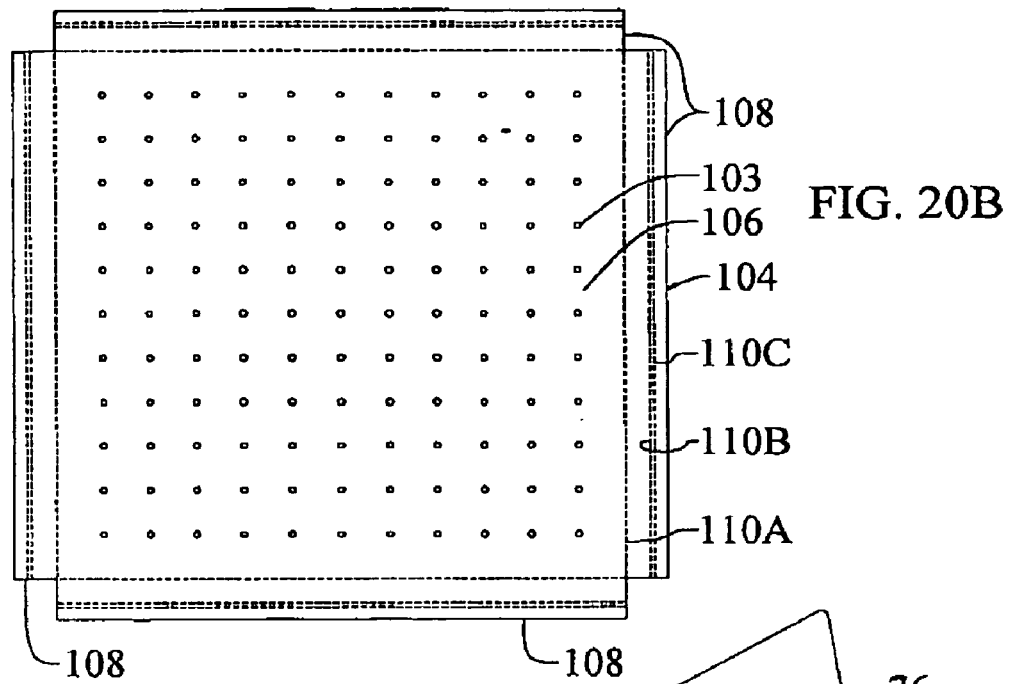
FIG. 20B is a top plan view of an alternate reflective sheet prior to forming into a cover onto a module.

The covers 102 shown are made from thin reflective aluminum, and are provided to the roof site in the form of flat panels 104 (FIGS. 20A-B). The panels 104 are provided openings for further control of the evaporation rate from the modules, such as with fixed, slatted louvers 103 (FIG. 20A) or perforations 105 (FIG. 20B). The panels 104 are formed with a square center 106 sized to cover the open top of the modules 18, and with four rectangular panels 108 extending outwardly from each side of the center portion. Each extension 108 is provided with at least two and preferably three reduced-thickness score-lines (shown in dashed lines) that extend along the length thereof. For installation onto the module 18 as shown in FIG. 21, the cover is positioned onto the top of the module, each extension is first folded along score-line 110a around the top outer edge of the flange, and is then folded along the score-line(s) 110b and/or 110c (depending on the wall thickness of the skirt) around the bottom of the skirt with the free end of the extension into position between the skirt and the sidewall of the module.

Provision of flat reflective panels 104 as described enables their use on modules of more than one size. For example, if the reflective panels are provided with 2'×2' square centers, they may be used to cover both 2'×2' modules and 2'×4' modules by folding extensions of adjacent reflective covers as shown in FIG. 22, and thereby establishing a 2'×4' center portion in the combined panel. The covers may be provided on the modules either with or without the covering screens 98 discussed above.

The light reflective nature of the covers 102 is further advantageous because this characteristic assists in reducing the temperature of the roof surface, during summer months, as compared with the roof temperature associated with exposed dark materials such as from colored rocks in the modules. In particular, providing a light-colored reflective covering can reduce the temperature at the roof surface by up to 10 to 13 degrees Fahrenheit. Thus the light reflective covers 102 further reduce the air conditioning requirements of the top floor of the building.

Accordingly, in still another alternate embodiment, all of the ballast modules on the roof are provided with the light reflective covers 102 to further reduce the temperature at the roof surface.

Figure 37:
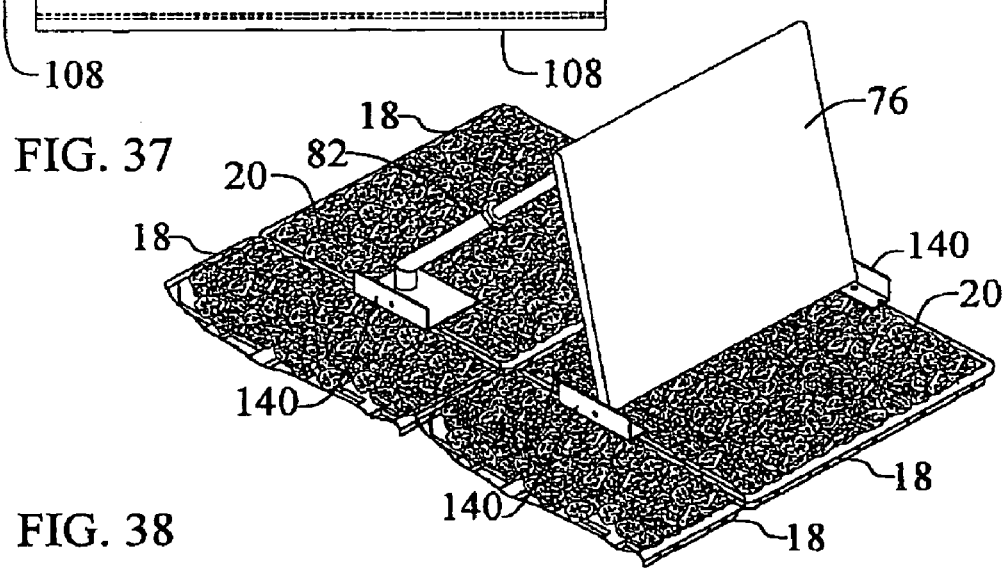
FIG. 37 a fragmentary perspective view of an alternate positioned photo-voltaic panel and anchoring system.
Figure 38:
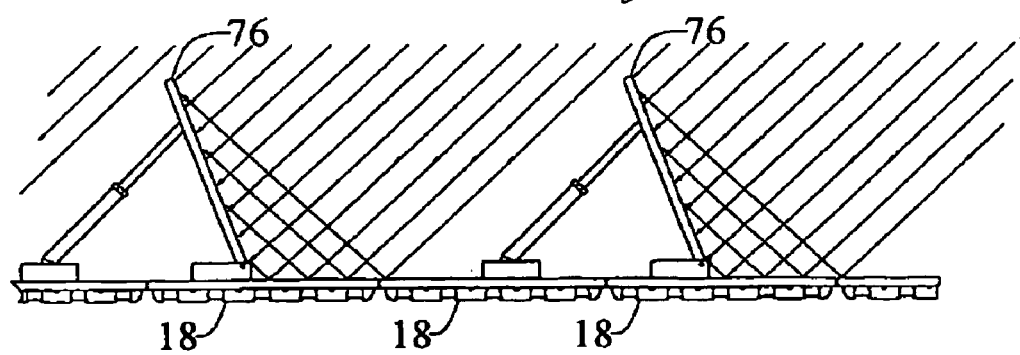
FIG. 38 is a fragmentary side view of the installed ballast module system and photo-voltaic panels shown in FIG. 37.
Figure 24:
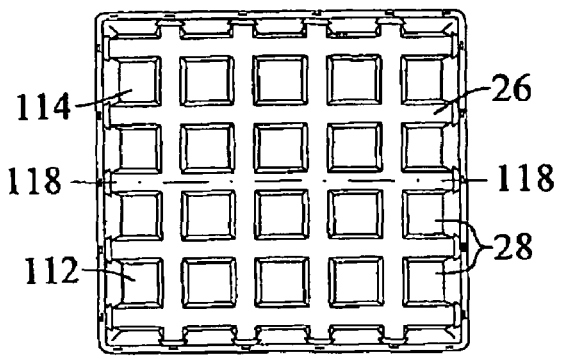
FIG. 24 is a top view of the module showing the location of a cut line prior to cutting the module into two module-portions for production of a reduced-size module.
Figure 25:
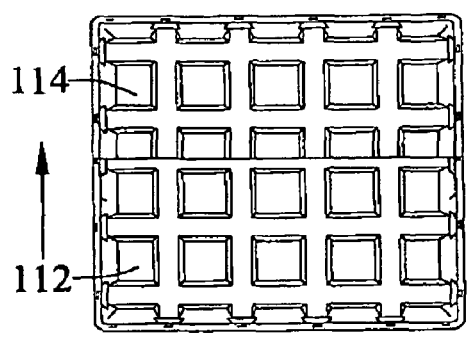
FIG. 25 is a top view of the cut module-portions, with one of the portions shown in an intermediate position over the other portion.

In an alternate embodiment shown in FIGS. 37-38, photo-voltaic panels 76 are pivotally anchored to connectors 140 that are installed securing adjacent modules 18 together. The panels are positioned in the center portion of the modules to extend to a position above that module and the adjacent module. As shown in FIG. 38, this arrangement permits the panels to "catch" rainfall that might otherwise fall and drain between the modules, and direct such additional rainfall into the modules. As a result, positioning of the photo-voltaic panels further assists in diverting rainfall into the modules and thereby controlling runoff from the building.

As noted above, green roof systems provide limited and unpredictable water retention capability. The ballast modules of the present invention may be used in a green roof system to enhance its water retention capability. The ballast modules may be used in a modular green roof system either in place of a number of green roof modules, or with both loose fill ballast up to approximately the overflow holes, and green roof materials including a root-barrier mat 90, growing medium 92 and live green roof plants 94 on top of the ballast and generally above the over-flow holes 22 as shown in FIG. 15. The modules may also be used in a non-modular green roof system with the modules surrounded by an appropriate edge finishing system as described above.

In additional alternate embodiments in which long-term standing water is of concern, and in which maximum of predictable runoff characteristics are desired, there is provided a ballast system comprising ballast modules that utilize water out-flow control characteristics established as discussed above during times of heavy rainfall, and that further provides for continued predictable, controlled seepage from the modules after the rainfall has ceased, to achieve a desired rate of water runoff from the roof thereafter.

In one alternate embodiment adapted for continued seepage, the ballast system is provided with wicking materials for predictable discharge of initially retained water from the modules over a shorter period of time as compared to the time required for unassisted evaporation.

Figure 31:
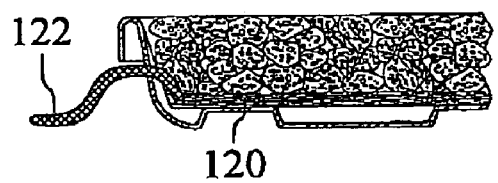
FIG. 31 is an enlarged fragmentary view of the ballast module shown in FIG. 30, with the ballast materials therein.
Figure 30:
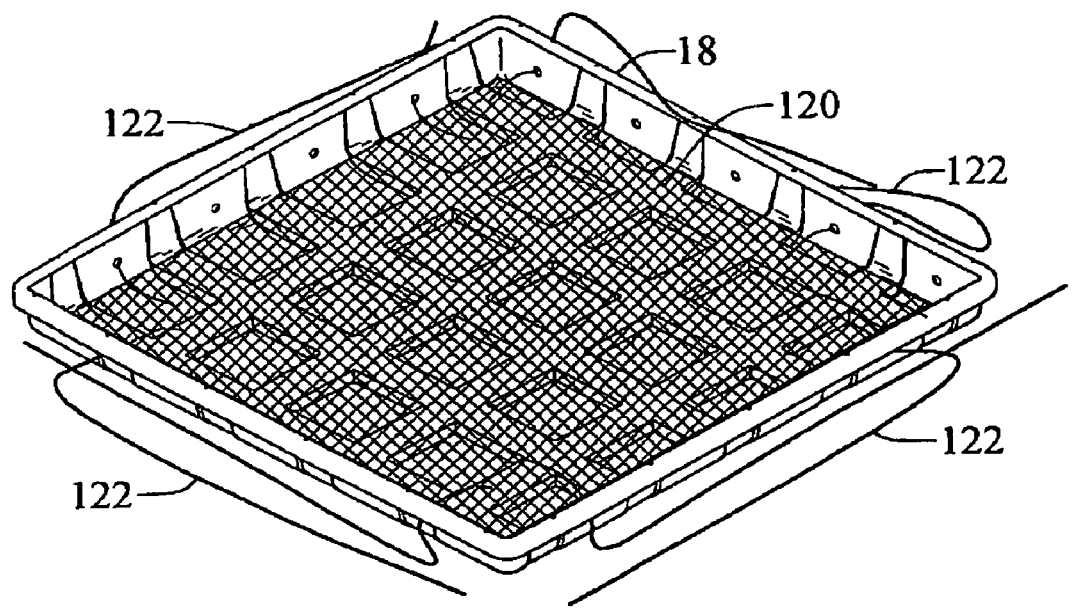

Referring to FIGS. 30-31, there is shown components of an alternate ballast system comprising modules provided with water discharge wicking materials in the form of an absorbent wicking pad 120 laid in the bottom of a module, and wicking rope 122 extending from the wicking pad through the water over-flow holes 22 and onto the roofing membrane. An alternate wicking arrangement shown in FIG. 30 comprises lengths of wicking rope laid in the bottom of the module and extending through the water over-flow holes 22 and onto the roofing membrane. In both instances, the wicking materials are designated to establish a controlled continued discharge of water from the modules after the rainfall has stopped, by wicking water from the pad and/or rope in the modules through the overflow holes and onto the roofing membrane, according to schedule that establishes a desired rate of water runoff from the roof.

Determination of water retention capabilities and characteristics of a ballast system with outflow wicking materials (e.g., pad 120 and rope 122) proceeds as generally as discussed above with regard to water retention characteristics, but further considers the physical and operational characteristics of the wicking materials extending through the outflow holes. In particular, sizing of the modules, overflow holes, and other module outflow characteristics will consider the presence of the wicking materials in the modules and extending through the overflow holes, including the continuous wicking effect and the effect on the flow area of the overflow holes. Determination of dynamic water run-off characteristics for the roof with ballast system outflow wicking materials will consider the dynamic water flow wicking characteristics of such materials. In particular, the module characteristics and wicking materials are designated to simultaneously meet the desired water retention characteristics, and to smooth the rate of water runoff both during and after a rainfall, thus reducing peak water runoff rates, and extending the runoff at a reduced rate for a longer period of time.

Figure 32:
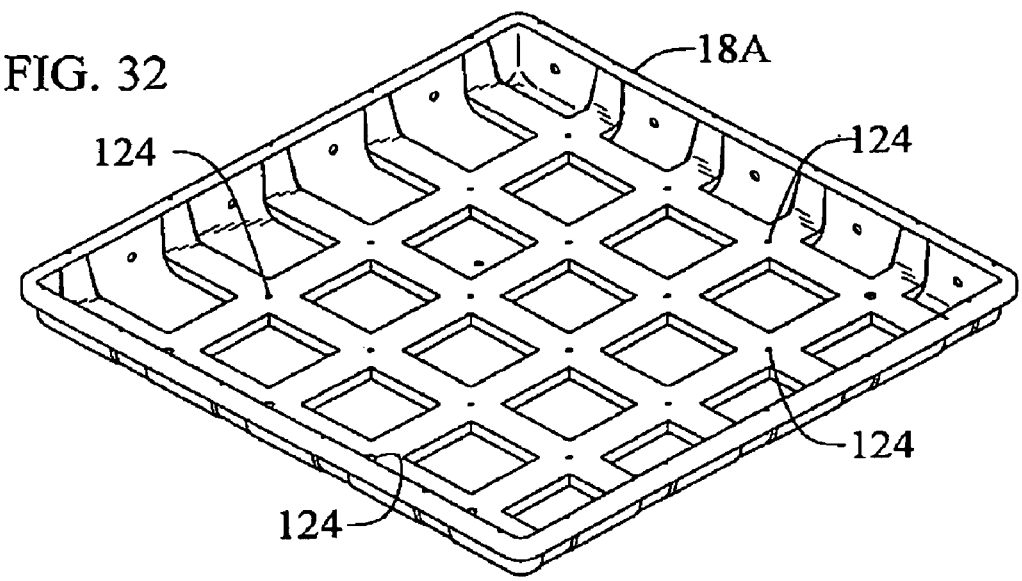
FIG. 32 is a perspective view of an alternate module adapted for controlled outflow of water.

Referring to FIG. 32, there is shown a module 18A of another alternate ballast system configured for continued water seepage after the rainfall has stopped. In this instance, relatively small drainage or seepage holes 124 are provided in the raised floor 26 of the modules for controlled continued discharge of water after the rainfall has stopped. As with the wicking materials discussed above, the seepage holes are sized to achieve a desired continued outflow rate from the modules, so as to establish the desired water runoff schedule from the roof after the rainfall has stopped. In particular, the ballast module characteristics are established generally as discussed above to achieve a short-term water retention characteristic, but with the seepage holes being sized for dynamic flow characteristics both during and after a heavy rainfall to slowly discharge the initially retained water from the modules.

By way of example, a ballast system provided with continued outflow wicking materials or seepage holes can be designed to retain a minimum of one inch of water during a heavy one hour rainfall, to smooth the peak rate of water runoff from the roof, and to then slowly discharge the initially retained over a designated longer period of time. Accordingly, the invention includes methods of providing and designating such ballast systems.

Figure 33:
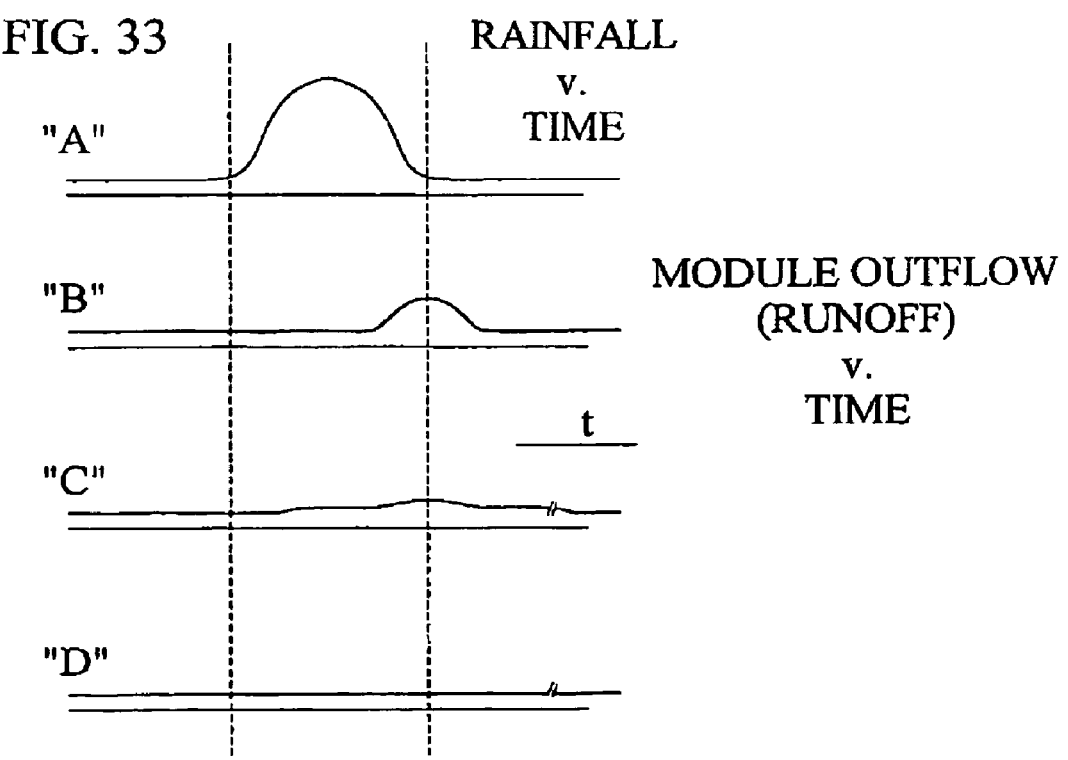
FIG. 33 is a graphical representation of rainfall v. time, and of water retention and outflow characteristics for three alternate ballast systems and/or three alternate rainfall magnitude scenarios.

Referring to FIG. 33, there is shown in curve "A" a graphical representation of a rainfall verses time. In curve "B" there is shown representation of a module outflow/roof runoff curve (verses time) for a ballast module provided with outflow holes 22. In this instance, runoff does not begin until the modules are filled to capacity (i.e., to the overflow holes), the peak runoff is reduced substantially as compared to the peak rainfall, and it occurs at approximately the point the rainfall ceases. Thereafter, the runoff ceases when the retained water in the modules lowers to its capacity at the height of the overflow holes. Curve "C" represents the roof runoff from a module provided with wicking or other residual controlled outflow characteristics (see FIGS. 29-32). In this instance, the runoff begins shortly after the rainfall begins, and continues at a relatively small rate until the retained water capacity of the module is reached, whereupon water flows directly out the overflow holes. As shown, the peak outflow drops after the rainfall stops to the seepage rate from the module, which continues for an extended period of time until the modules are substantially drained. The curve "D" represents zero outflow when the retained water capacity of a module, without residual runoff, is not reached. These curves represent a sampling of the possible controlled water runoff characteristics from a roof that is possible with a modular ballast system hereof; other characteristic runoff curves will be represented in embodiments designated in accordance herewith, and under different rainfall conditions.

From the foregoing, it will be apparent that the present invention brings to the art a unique ballast system for roofing membranes of the type used on industrial and commercial buildings.

By virtue of its modular construction the modular ballast system provides for ease of maintenance and repair of the roof membrane. The contained loose ballast material does not subject the roof membrane to wear such as from walking on or shifting of the ballast from windy conditions on the roof. The sidewall structure waffle-floor configuration of the modules provides ease of walking directly on ballast. Only the necessary modules need to be removed for repair to the roofing membrane in specific locations. And removal and reinstallation of the entire ballast system, by simply disconnecting and removing the filled modules, is much easier as compared with prior loose-fill ballast systems.

The modular ballast system in accordance with the invention also predictably reduces water runoff from a building, by retaining a predetermined volume of water on the roof, and thus controls the rate of runoff thereafter up to a maximum volume capacity and rate of rainfall. This predictable water retention capability predictably eases peak load of storm sewers around building. The drain holes in the sides of the modules are positioned to meet minimum water retention requirements, and are sized to meet rate of runoff requirements thereafter. Consequently, the runoff from a particular roof is adjusted by adjusting the size, frequency and position of the drain holes in the sides of the modules. The modular ballast system also provides enhanced water runoff control from a building as compared with prior ballast systems and green roof systems, both during and optionally after a rainfall.

Additional advantages and unique characteristics of the modular ballast system of the invention include: Evaporation of retained water from the modular ballast system cools the air above building, reducing urban heat island problem in large, crowded cities. The modular ballast system enables ease of predictable, predetermination of maximum ballast and water weight conditions on the roof. For a particular module size, with holes at an established height, the modular ballast system enables regulation of the ballast weight by the type of ballast selected. The modular ballast system permits use of many desired fill materials, including decorative rocks and other objects that may have relatively sharp corners so as to be unsuitable for use in a conventional loose-laid ballast system, but that are less expensive than round river rocks. The modular ballast system enables use of alternate textures, colors and loose-fill ballast materials for decorative effect; this is not conveniently possible on roofs with conventional loose-fill ballast material over entire membrane. The modular ballast system provides even distribution of weight over membrane, and prevents shifting of loose-fill ballast from changing wind conditions, good unidirectional water flow across membrane. The modular system provides enhanced resistance to wind uplift via connection of modules together and connection of an edge finishing system. The resistant to wind uplift is further enhanced with provision cable tie-down between the modules. The ballast modules may be alternately used in a modular green roof system, preferably provided with compatible modules, such as disclosed in U.S. patent application Ser. Nos. 09/908,864, 09/908,880 and 09/908,881, for enhanced water retention capability. And the modular ballast system provides a mounting platform and anchoring system to establish a roof-top energy production system.

I claim:

1. A modular ballast system for roofs, the system including:

a) a rectangular module having:

i) sidewalls extending upwardly from a bottom; and ii) a module interior space defined by the sidewalls of the module;

b) a first pair of corner bases and a second pair of corner bases, wherein:

i) the two pairs of corner bases are positioned at the corners of the module; and ii) each corner base in the first pair of corner bases includes a corner base hole extending therethrough; and c) a pair of front supports and a pair of back supports, wherein:
   i) each front support extends:
      1) upwardly from the module interior space, and
      2) through the corner base hole of one of the first pair of corner bases, and
   ii) each back support extends upwardly from one of the second pair of corner bases; and
d) a photo-voltaic panel secured to the front and back supports.

2. The system of claim 1 wherein:
a) the photo-voltaic panel makes a panel angle with a top of the module; and
b) the pair of back supports have adjustable lengths such that the panel angle is adjustable.

3. The system of claim 1 wherein:
a) the photo-voltaic panel makes a panel angle with a top of the module; and
b) the photo-voltaic panel is hingedly secured to the pair of front supports such that the panel angle is adjustable.

4. The system of claim 3 further including a second module, wherein the photo-voltaic panel makes an adjustable panel angle with a top of the module, the panel angle being adjustable to a position in which at least a portion of the photo-voltaic panel is positioned above a junction between the module and the second module.

5. The system of claim 1 further including:
a) a second module adjacent to the module, the second module having a second module interior space with ballast therein; and
b) a cover positioned over at least a portion of a top of the second module, the cover being light-reflective so as to limit heating resulting from the absorption of light.

6. A modular ballast system for roofs, the system including:
a) a rectangular module having sidewalls extending upwardly from a bottom, the bottom and sidewalls defining a module interior space;
b) ballast materials in the module interior space;
c) an energy collection apparatus;
d) a first pair of corner bases and a second pair of corner bases,
   i) each corner base in the first pair of corner bases having a corner base hole extending therethrough,
   ii) the two pairs of corner bases positioned at the corners of the module; and
e) a pair of front supports and a pair of back supports, wherein:
   i) the front supports extend:
      (1) upwardly from the module interior space,
      (2) through the corner base holes of the first pair of corner bases, and
      (3) to the energy collection apparatus, the pair of front supports being secured to the energy collection apparatus; and
   ii) the back supports extend:
      (1) from the second pair of corner bases, and
      (2) to the energy collection apparatus, the pair of back supports being secured to the energy collection apparatus.

7. The system of claim 6 wherein:
a) the energy collection apparatus is a photo-voltaic panel; and
b) the front and back supports are configured to support the photo-voltaic panel at a panel angle with a top of the module.

8. The system of claim 7 wherein the pair of back supports have adjustable lengths to allow the panel angle to be adjustable.

9. The system of claim 7 wherein the photo-voltaic panel is hingedly secured to the pair of front supports to allow the panel angle to be adjustable.

10. The system of claim 9 further including a second module, wherein the panel angle is adjustable to a position in which at least a portion of the photo-voltaic panel is positioned above a junction between the module and the second module.

11. A modular ballast system for roofs, the ballast system including:
a) a rectangular module having sidewalls extending upwardly from a bottom,
   i) the bottom and sidewalls defining a module interior space,
   ii) the module having a first pair of module corners and a second pair of module corners;
b) an energy collection apparatus;
c) a pair of corner bases,
   i) each corner base having a corner base hole extending therethrough,
   ii) the pair of corner bases positioned at the first pair of module corners; and
d) a pair of front supports and a pair of back supports, wherein:
   i) the front supports extend:
      (1) upwardly from the module interior space,
      (2) through the corner base holes of the pair of corner bases, and
      (3) to the energy collection apparatus, the pair of front supports being secured to the energy collection apparatus; and
   ii) the back supports extend:
      (1) from the second pair of module corners, and
      (2) to the energy collection apparatus, the pair of back supports being secured to the energy collection apparatus.

12. The system of claim 11 wherein:
a) the energy collection apparatus makes an apparatus angle with respect to a top of the module; and
b) the pair of back supports have adjustable lengths to allow the apparatus angle to be adjustable.

13. The system of claim 11 wherein the energy collection apparatus:
a) makes an apparatus angle with respect to a top of the module; and
b) is hingedly secured to the pair of front supports to allow the apparatus angle to be adjustable.

14. The system of claim 13 further including a second module, wherein the apparatus angle is adjustable to a position in which at least a portion of the energy collection apparatus is positioned above a junction between the module and the second module.

15. A modular ballast system for roofs,
a) the system comprising:
   i) a plurality of rectangular modules connected in contiguous relation, the modules having an open top and a closed bottom established with:
      (1) a floor configured for resting on a roof and for allowing multi-directional water flow thereunder and therebetween, and
      (2) sidewalls extending upwardly from the bottom, the sidewalls having over-flow holes formed therethrough at a predetermined height above the bottom for retaining a predetermined volume of water therein;
ii) loose-fill ballast materials in the modules;
iii) a first pair of corner bases and a second pair of corner bases,
(1) each corner base in the first and second pairs of corner bases having a corner base hole extending therethrough,
(2) the two pairs of corner bases positioned at the corners of a first module; and
iv) a pair of front supports and a pair of back supports, wherein:
(1) each front support extends from the corner base holes of the first pair of corner bases to a photo-voltaic panel, the pair of front supports being secured to the photo-voltaic panel; and
(2) each back support extends from the corner base holes of the second pair of corner bases to the photo-voltaic panel, the pair of back supports being secured to the photo-voltaic panel;
b) wherein:
i) the photo-voltaic panel makes a panel angle with the open top of the first module;
ii) the photo-voltaic panel is hingedly secured to the pair of front supports such that the panel angle is adjustable;
iii) the first module includes a first module interior space defined by the bottom and sidewalls of the first module; and
iv) each of the pair of front supports extends upwardly from the first module interior space and through the corner base holes of the first pair of corner bases.

16. The modular ballast system as defined in claim 15 further comprising connectors secured to the modules to establish a roof top mounting platform for mounting an alternate energy collection apparatus above the roof.

17. The modular ballast system as defined in claim 15 further comprising a cover positioned over the open top of one of the modules, the cover being reflective so as to substantially limit heating of a roof.

18. The modular ballast system as defined in claim 15 in which the sidewalls include flanges having horizontal portions provided with vertically extending holes, the system further comprising connectors configured for vertically inserting into holes of flanges of adjacent modules and spanning across the sides of the adjacent modules.

19. The modular ballast system as defined in claim 15 in which the modules are tied together with cable extending across the sides of adjacent modules.

20. The modular ballast system as defined in claim 15 in which the sidewalls include flanges with a horizontal portion and a downwardly depending skirt, the system further comprising connectors having a top member spanning across the sides of adjacent modules and a lower upwardly facing channel member sized to the surround the flange skirt of adjacent modules, and means for connecting the top member and the lower channel to draw the lower channel into snug engagement against the skirts of adjacent flanges.

21. The modular ballast system as defined in claim 20 in which the connectors further comprise threaded fasteners to draw the upper and lower channels into snug engagement with the flanges of adjacent modules, the fasteners including eyelets at the upper ends thereof, the system further comprising cables threaded through the eyelets and anchored to one of eyelets of adjacent panels or an anchor connected to the roof structure.

22. The modular ballast system as defined in claim 15 further comprising edge finishing having elongated edge termination members extending from the sidewalls of the modules to the roof, and clip means connecting the edge termination members to the outer sidewalls of the modules.

23. The modular ballast system as defined in claim 22 in which the sidewalls of the modules include a flange with downwardly depending outer skirt, and said clip means includes an upwardly extending clip to engage between the skirt and the sidewall of the module.

24. The modular ballast system as defined in claim 15 further comprising an absorbent mat in bottom of module.

25. The modular ballast system as defined in claim 15 further comprising an absorbent pad with absorbent clay.

26. The modular ballast system as defined in claim 15 further comprising wicking extending from the bottom of the modules out the over-flow holes to achieve continuous controlled outflow of water when water is present in the module.

27. The modular ballast system as defined in claim 15 in which the floor of the module is formed with small holes sized to achieve a predetermined dynamic continuous outflow characteristic.

28. The modular ballast system as defined in claim 15 further comprising a bug screen secured over the open top of the modules, at a height above the over-flow holes.

29. The modular ballast system of claim 15 further including a plurality of cables connecting the modules together to secure the modules to a roof.

30. The system as defined in claim 29 in which the sidewalls include outer flanges having downwardly depending skirts, the system further comprising a connector having upper and lower members, the upper member being sized to span across the flanges of adjacent modules, the lower member having a center portion and upwardly extending legs sized to fit between the skirt and the sidewalls of the modules, and a fastener connecting the upper and lower members together to draw the adjacent modules snugly together, the connector further having means for receiving the cable connecting the modules together.

31. A method for establishing the modular ballast system of claim 15 comprising:
a) installing the modules in contiguous relation on a roof;
b) filling the modules to a predetermined level with loose ballast fill; and
c) cooperatively determining
i) the volume of the ballast fill materials in the modules, and
ii) the height of over-flow holes in the sidewalls to achieve predetermined water retention and out-flow characteristics for the modules.

32. The method of claim 31 further including the step of forming over-flow holes in the sidewalls at the cooperatively-determined height.

33. A method for establishing the modular ballast system of claim 15 comprising:
a) installing the modules in contiguous connected relation on a roof;
b) determining the water retention and out-flow characteristics of the modules by determining the space density of the ballast, the flow characteristics of over-flow holes in the sides of the modules, and the footprint area of the modules; and
c) filling the modules with loose ballast to establish the determined water retention characteristics.

34. The modular ballast system of claim 15 wherein the pair of back supports have adjustable lengths such that the panel angle is adjustable.

35. The modular ballast system of claim 15 wherein:
a) each corner base in the first and second pairs of corner bases:
  i) includes a base first side and a base second side, the base first side being at least substantially perpendicular to the base second side; and
  ii) is secured to the first module by a base fastener; and
b) each corner base hole of the corner bases is positioned over the first module interior space.

36. The modular ballast system of claim 35 further including:
a) a second module adjacent to the first module; and
b) a cover positioned over the open top of the second module, the cover:
  1) including reflective metal; and
  2) being configured to limit heating of the roof.

37. The modular ballast system of claim 15 wherein the panel angle is adjustable to a position in which at least a portion of the photo-voltaic panel is positioned above a junction between two adjacent modules.

* * * * *